(12) United States Patent
Maekawa et al.

(10) Patent No.: US 6,235,098 B1
(45) Date of Patent: May 22, 2001

(54) HOT-MELT INK COMPOSITIONS FOR INK-JET PRINTING

(75) Inventors: Tsutomu Maekawa; Akemi Ouchi; Atsushi Kakuta, all of Ibaraki (JP)

(73) Assignee: Hitachi Koki Co., Ltd., Tokyo (JP)

(*) Notice: Subject to any disclaimer, the term of this patent is extended or adjusted under 35 U.S.C. 154(b) by 0 days.

(21) Appl. No.: 09/339,810

(22) Filed: Jun. 25, 1999

(30) Foreign Application Priority Data

| Jun. 26, 1998 | (JP) | ................................. | 10-180699 |
| Jun. 26, 1998 | (JP) | ................................. | 10-180700 |
| Jun. 26, 1998 | (JP) | ................................. | 10-180701 |
| Apr. 8, 1999 | (JP) | ................................. | 11-100742 |

(51) Int. Cl.$^7$ ............................. C09D 11/02; C09D 11/12
(52) U.S. Cl. ...................................... 106/31.61; 106/31.62
(58) Field of Search .............................. 106/31.61, 31.62

(56) References Cited

U.S. PATENT DOCUMENTS

| 4,659,383 | * | 4/1987 | Lin et al. | ........................... | 106/31.61 |
| 5,122,187 | * | 6/1992 | Schwarz et al. | .................. | 106/31.29 |
| 5,350,446 | * | 9/1994 | Lin et al. | ........................... | 106/31.61 |
| 5,421,873 | * | 6/1995 | Arimura et al. | .................. | 106/31.29 |
| 5,645,632 | * | 7/1997 | Pavlin | ............................... | 106/31.29 |
| 5,772,742 | | 6/1998 | Wang . | | |

FOREIGN PATENT DOCUMENTS 10-329403   12/1998   (JP) .

* cited by examiner

Primary Examiner—Helene Klemanski
Assistant Examiner—Veronica F. Faison
(74) Attorney, Agent, or Firm—McGinn & Gibb, PLLC

(57) ABSTRACT

A hot-melt ink composition comprising at least one composition of: (a) a cyan ink composition containing a cyan pigment as a colorant, wherein the cyan ink composition shows a maximum chroma C* on a recording medium of 45 or higher, a hue angle H° at the maximum chroma of from 240° to 270° and a color difference ΔE* of 3 or smaller as measured through 100-hour irradiation with xenon lamp light at a luminous energy of 0.35 W/m$^2$ and a wavelength of 340 nm; (b) a yellow ink composition containing a yellow pigment as a colorant, wherein the yellow ink composition shows a maximum chroma C* on a recording medium of 70 or higher, a hue angle H° at the maximum chroma of from 90° to 110° and a color difference ΔE* of 5 or smaller as measured through 100-hour irradiation with xenon lamp light at a luminous energy of 0.35 W/m$^2$ and a wavelength of 340 nm; and (c) a magenta ink composition containing a magenta pigment as a colorant, wherein the magenta ink composition shows a maximum chroma C* on a recording medium of 60 or higher, a hue angle H° at the maximum chroma of from 340° to 360° and a color difference ΔE* of 5 or smaller as measured through 100-hour irradiation with xenon lamp light at a luminous energy of 0.35 W/m$^2$ and a wavelength of 340 nm.

17 Claims, 4 Drawing Sheets

HOT-MELT INK COMPOSITIONS FOR INK-JET PRINTING

FIELD OF THE INVENTION

The present invention relates to an hot-melt ink composition for use, e.g., in an ink-jet recording apparatus.

BACKGROUND OF THE INVENTION

Water-based liquid ink compositions have conventionally been widely used for ink-jet printing. However, the recording paper media to which such water-based ink compositions are applicable are limited to converted papers because the ink compositions are apt to permeate plain paper to cause "coalescence". For use in recording on overhead projector (OHP) sheets, the water-based ink compositions necessitate a special treatment of the sheet surface because of the poor drying properties of the inks. Under these circumstances, a hot-melt ink-jet recording technique has been proposed in which a hot-melt ink composition based on a wax or the like which is solid at room temperature is used as an ink composition which provides a satisfactory print quality irrespective of paper quality. In this technique, the ink composition is liquefied by heating or another means, and the melt is ejected by applying some energy thereto. The ejected ink droplets are adhered to a recording medium and allowed to cool and solidify to thereby form ink dots.

Major advantages of the above ink-jet recording technique are that the ink does not cause fouling during handling because it is solid at room temperature, and that it does not cause nozzle clogging because ink evaporation, which occurs when the ink is in a molten state, can be minimized. Still another advantage thereof is that the ink is free from "coalescence" because it solidifies immediately after adhesion to the recording medium. Consequently, various recording media ranging from Japanese paper to drawing paper and post card paper can be used without any pretreatment or the like. In U.S. Pat. Nos. 4,390,369, 4,484,948, 5,350,789, and 5,703,145 are described ink compositions which provide a satisfactory print quality irrespective of paper quality. JP-A-5-311101 (the term "JP-A" as used herein means an "unexamined published Japanese patent application") describes an ink-jet hot-melt ink composition having excellent light transmission which contains a polyamide and a fatty acid amide. Other ink-jet hot-melt ink compositions having excellent light transmission are described in JP-A-5-194897 and JP-A-6-107987, which contain a glyceride.

On the other hand, a generally employed technique for improving the weather resistance of prints is to use pigments as colorants for inks. Such pigmented inks are used in various printers including laser printers, melt transfer printers, liquid-ink-jet printers, and solid-ink-jet printers. For example, many reports have been made on pigmented inks for use in solid-ink-jet printers, e.g., in JP-A-3-37278, JP-A-4-339871, JP-A-5-16343, JP-A-5-105832, JP-A-6-49400, JP-A-6-228479, JP-A-6-228480, JP-A-6-306319, JP-A-7-109432, JP-A-7-196968, JP-A-7-278477, JP-A-7-306319, JP-A-7-316479, JP-A-7-331141, and JP-A-8-295836. In JP-A-61-159470 is described a hot-melt ink comprising a vehicle comprising an alcohol having from 18 to 24 carbon atoms and, contained in the vehicle, graphite particles which have been dispersed beforehand in an oil carrier compatible with the vehicle.

However, the hot-melt ink compositions described above have a drawback that it is generally difficult to maintain compatibility between the components and, hence, the ink compositions in a molten state are apt to suffer colorant separation especially when the colorant used is an organic pigment having excellent weather resistance. As is well known, the sedimentation of particles dispersed in a liquid depends on the diameter of the particles, the viscosity of the dispersion medium, and sedimentation period. The higher the viscosity of the dispersion medium, the less the particles sediment. On the other hand, from the standpoint of using an ink in printing with an ink-jet printer, lower ink viscosities are advantageous for higher printing speeds and higher densities and are suitable for highly reliable printing. Thus, the prevention of pigment sedimentation in an ink and the performance of the ink in printing have been inconsistent with each other.

As described above, the hot-melt ink-jet recording technique in which an organic pigment having excellent weather resistance is used as a colorant has many advantages over the ink-jet recording technique in which a dye is used. The former technique is hence expected to be used not only in OA apparatuses, domestic printers, facsimile telegraphs, and the like but in applications such as outdoor or indoor posters, large signboards, the decoration of motor vehicles or elevators, and fabric printing. However, the above-described problem that the prevention of ink separation is inconsistent with highly reliable print quality has been an obstacle to the commercial use of the technique. There has frequently been such a trade-off that pigments having relatively good dispersibility in vehicle resins generally have poor weather resistance.

SUMMARY OF THE INVENTION

An object of the present invention is to provide a pigmented ink composition for a solid-ink-jet printer, which attain both low-viscosity characteristics with excellent flowability sufficient for ejection of ink droplets from a minute nozzle and freedom from ink separation.

Another object of the present invention, which is more important, is to provide an ink composition for a solid-ink-jet printer which realize a high-chroma color print.

Other objects and effects of the invention will become apparent from the following description.

The above-described objectives of the present invention have been achieved by the following hot-melt ink compositions for ink-jet printing in which the ink composition, which is solid at room temperature, is liquefied by heating and ejected to form an ink dot on a recording medium.

1) A hot-melt ink composition comprising at least one composition of:
   (a) a cyan ink composition containing a cyan pigment as a colorant, wherein the cyan ink composition shows a maximum chroma C* on a recording medium of 45 or higher, a hue angle H° at the maximum chroma of from 240° to 270° and a color difference $\Delta$E* of 3 or smaller as measured through 100-hour irradiation with xenon lamp light at a luminous energy of 0.35 W/m² and a wavelength of 340 nm;
   (b) a yellow ink composition containing a yellow pigment as a colorant, wherein the yellow ink composition shows a maximum chroma C* on a recording medium of 70 or higher, a hue angle H° at the maximum chroma of from 90° to 110° and a color difference $\Delta$E* of 5 or smaller as measured through 100-hour irradiation with xenon lamp light at a luminous energy of 0.35 W/m² and a wavelength of 340 nm; and
   (c) a magenta ink composition containing a magenta pigment as a colorant, wherein the magenta ink composition shows a maximum chroma C* on a recording medium of 60 or higher, a hue angle H° at the maximum chroma of from 340° to 360° and a color difference ΔE* of 5 or smaller as measured through 100-hour irradiation with xenon lamp light at a luminous energy of 0.35 W/m² and a wavelength of 340 nm.

2) The hot-melt ink composition according to the above 1), comprising said cyan ink composition (a), wherein said cyan pigment is a pigment which falls under C.I. Pigment Blue 15:4.

3) The hot-melt ink composition according to the above 1), comprising said yellow ink composition (b), wherein said yellow pigment is a pigment which falls under any of C.I. Pigment Yellows 93, 94, 95 and 128.

4) The hot-melt ink composition according to the above 1), comprising said magenta ink composition (c), wherein said magenta pigment is a pigment which falls under C.I. Pigment Red 122.

5) The hot-melt ink composition according to the above 2), wherein said cyan ink composition (a) further comprises an alcoholic wax having a hydroxyl value of from 20 to 150.

6) The hot-melt ink composition according to the above 2), wherein said cyan ink composition (a) has a melt viscosity of not higher than 15 mPa·s at the time of printing.

7) The hot-melt ink composition according to the above 5), wherein said cyan ink composition is produced by kneading ingredients comprising said pigment and said wax with a high-temperature bead mill at a rotational speed of not lower than 2,000 rpm.

8) The hot-melt ink composition according to the above 3), wherein said yellow ink composition (a) further comprises an alcoholic wax having a hydroxyl value of from 20 to 150.

9) The hot-melt ink composition according to the above 3), wherein said yellow ink composition (a) has a melt viscosity of not higher than 15 mPa·s at the time of printing.

10) The hot-melt ink composition according to the above 8), wherein said yellow ink composition is produced by kneading ingredients comprising said pigment and said wax with a high-temperature bead mill at a rotational speed of not lower than 2,000 rpm.

11) The hot-melt ink composition according to the above 4), wherein said magenta ink composition (a) further comprises an alcoholic wax having a hydroxyl value of from 20 to 150.

12) The hot-melt ink composition according to the above 4), wherein said magenta ink composition (a) has a melt viscosity of not higher than 15 mPa·s at the time of printing.

13) The hot-melt ink composition according to the above 11), wherein said magenta ink composition is produced by kneading ingredients comprising said pigment and said wax with a high-temperature bead mill at a rotational speed of not lower than 2,000 rpm.

14) The hot-melt ink composition according to the above 1), comprising all of said cyan ink composition (a), said yellow ink composition (b) and said magenta ink composition (c).

15) The hot-melt ink composition according to the above 14), wherein said cyan pigment is a pigment which falls under C.I. Pigment Blue 15:4, said yellow pigment is a pigment which falls under any of C.I. Pigment Yellows 93, 94, 95 and 128, and said magenta pigment is a pigment which falls under C.I. Pigment Red 122.

16) The hot-melt ink composition according to the above 14), further comprising an alcoholic wax having a hydroxyl value of from 20 to 150.

17) The hot-melt ink composition according to the above 14), having a melt viscosity of not higher than 15 mPa·s at the time of printing.

A main feature of the present invention, having the constitutions described above, resides in that the hot-melt ink composition securely has a low melt viscosity, e.g., 15 mPa·s or lower, upon use even at a high concentration to provide a high chroma.

BRIEF DESCRIPTION OF THE DRAWINGS

FIG. 2-1 is a graph showing the relation between a pigment concentration and a chroma and between a pigment concentration and a hue.

FIG. 3-1 is a graph showing the relation between a pigment concentration and a chroma and between a pigment concentration and a hue.

FIG. 4-1 is a CIE chromaticity gamut diagram for color inks.

FIG. 4-2 is a graphic presentation showing the results of an accelerated light deterioration test of color inks.

DETAILED DESCRIPTION OF THE INVENTION

Figure 1:
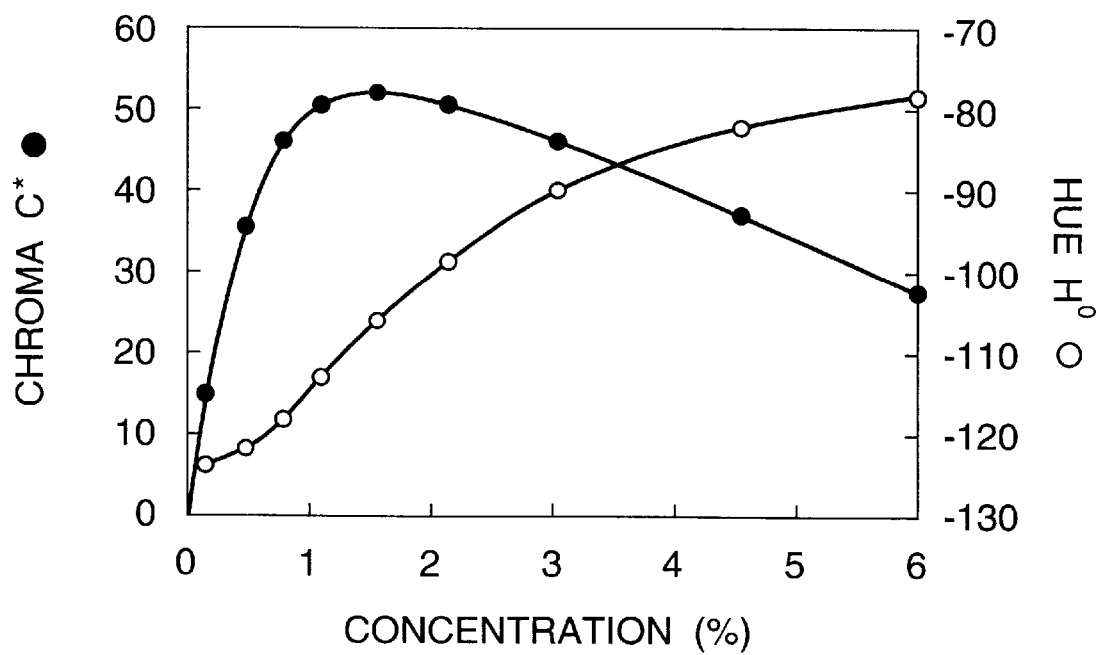
FIG. 1-1 is a graph showing the relation between a pigment concentration and a chroma and between a pigment concentration and a hue.

The color characteristics employed in the present invention are defined with the CIE (L*, a*, b*) color system through measurement with illuminant C at a viewing angle of 2°. In the case where characteristic values obtained under other definitions, e.g., measurement results under conditions of illuminant $D_{65}$ and a viewing angle of 10°, are to be compared with the color characteristics according to the invention, it requires numerical conversion using an absorption spectrum, chromaticity function, etc. The chroma C*, hue angle H°, and color difference ΔE* are defined by the following equations. The unit for H° is degree, and the other characteristics are expressed in terms of nondimensional number.

$$C^* = ((a^*)^2 + (b^*)^2)^{1/2}$$

$$H° = (180/\pi) \times \tan^{-1}(b^*/a^*)$$

$$\Delta E^* = ((\Delta L^*)^2 + (\Delta a^*)^2 + (\Delta b)^2)^{1/2}$$

The xenon lamp and its luminous energy used in the present invention are within the range of conditions generally employed in weathering tests, and are not special. The wavelength of 340 nm is well known to correspond to the deterioration of general organic materials by ultraviolet and the luminous energy of 0.35 W/m² is a typical value corresponding to sunlight. It has been reported that irradiation under these conditions results in a deterioration rate about from 5 to 10 times that under direct sunlight. For details thereof, reference may be made to many publications such as, e.g., F. E. Crewdson, *Material Life Society Data* (1992); L. S. Crump, *ATLAS Sun Spots*, 3rd/4th Quater, pp. 1–6 (1996); *Guide to Apparatus Selection* (1989) (Toyo Seiki Seisaku-sho, Ltd.); *Xenotest Data* (1986) (Heraerus); and Nakano et al., *Convertec*, pp.56–59 (1998. 4).

In the present invention, each of the ink compositions (a) to (c) respectively containing a cyan, yellow and magenta pigment is regulated so that when used in printing under such conditions as to give a maximum chroma, the value of maximum chroma C* and the value of hue angle H° for the maximum chroma are within respective specific ranges. Furthermore, each of the ink compositions (a) to (c) is regulated so that when a print obtained therewith under these conditions is subjected to a light resistance test, the resultant color difference ΔE* is within a specific range. Specifically, the cyan ink composition (a) has a maximum chroma C* of 45 or higher, a hue angle H° of from 240° to 270°, and a ΔE* of 3 or smaller; the yellow ink composition (b) has a maximum chroma C* of 70 or higher, a hue angle H° of from 90° to 110°, and a ΔE* of 5 or smaller; and the magenta ink composition (c) has a maximum chroma C* of 60 or higher, a hue angle H° of from 340° to 360°, and a ΔE* of 5 or smaller.

Although it may be known in this field to regulate an ink for use in high-quality printing so as to have a chroma and a hue angle respectively within specific ranges, ink-jet printing under further satisfactory conditions in terms of light resistance to provide high-quality prints has not been conducted. It is also known that the chroma of a print varies depending on printing conditions such as the ink amount in each dot, the colorant concentration in the ink, and the number of dots. The term "maximum chroma" as used in the present invention is defined as the maximum value of chroma which is attainable with the ink when the ink amount and colorant concentration are changed throughout the possible ranges. As is well known, inks generally have a tendency that as the ink amount and the colorant concentration increase, the chroma increases, reaches a specific maximum value, and then decreases (the color becomes darker). The values of maximum chroma for the respective colors in the present invention are defined as those obtained under conditions including an optimal colorant amount.

A feature of the present invention resides in that one of these colors or a combination of these colors is used. The present invention also includes an embodiment that is intended to realize full-color printing based on four colors. From the standpoint of attaining a wide color reproduction range, it is especially preferred to regulate each ink so as to have a chroma and a hue angle within the respective ranges specified in the present invention.

Examples of the cyan pigment (blue or cyan pigment) for use in the present invention include C.I. Pigment Blues 1, 15, 15:1, 15:2, 15:3, 15:4, 15:5, 15:6, 16, 17:1, 22, 27, 28, 29, 36, and 60.

The cyan pigments most suitable for accomplishing the objects of the present invention are those generally called phthalocyanine blue, which are known as materials having many satisfactory properties. A molecular structure thereof is shown below.

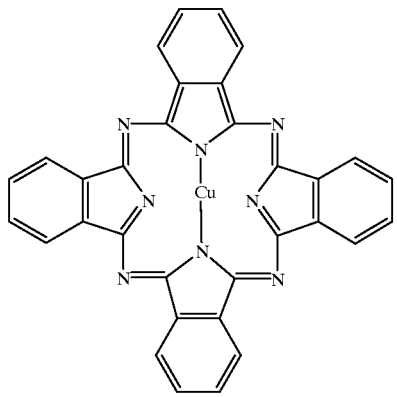

Phthalocyanine blues (including copper phthalocyanine, etc) have been reported to exist in many crystalline forms such as, e.g., α, β, γ, δ, ε, π, ρ, τ, X and R forms. These phthalocyanine compounds are classified, e.g., as C.I. Pigment Blue 15 (α form), Pigment Blue 15:1 (monochloro-substituted form), Pigment Blue 15:2 (noncrystalline, monochloro-substituted form), Pigment Blue 15:3 (β form), Pigment Blue 15:4 (noncrystalline, nonflocculating β form), Pigment Blue 15:5 (γ form), and Pigment Blue 15:6 (ε form). Metal-free phthalocyanine (Pigment Blue 16) and polyhalogen-substituted copper phthalocyanines (Pigment Greens 7 and 36) belong to the same family.

In the present invention, cyan pigments falling under C.I. Pigment Blue 15:4 are the most effectively used. These pigments have the highest level of light resistance (color fastness to ultraviolet) and have a cyan hue ideal for colorants. Examples of the pigments falling under C.I. Pigment Blue 15:4 include the following untreated and treated pigments. However, the cyan pigments for use in the present invention should not be construed as being limited thereto.

The examples thereof include: Chromofine Blue 4930P, 4940, 4942, 4950, 4966, 4973, 4976EP, 4983, S-2100, and S-32 and Cyanine Blue 4933GN-EP, 4940, 4973, 4976-EP, 127-EPS, and 4927G-EPB (manufactured by Dainichiseika Color & Chemicals Mfg. Co., Ltd.); Fastogen Blue 5410G, 5412G, 5415, 5480, 5481, 5485, 5486, 5488, FGS, GNPS, GNPM-K, GNPW, NK, TGR-F, 5421, 5422, 5424, 5425, 3F-12, GFA, GFB, NK-G, and 5412SD (manufactured by Dainippon Ink & Chemicals, Inc.); Heliogen Blue D7060T, D7105T, 7160TD, L7101F, D7106, and D7111 (manufactured by BASF AG); Hostaperm Blue BFL and Monarch Blue GFR X-3374 (manufactured by Hoechst AG); Irgalite Blue 4GF-BR, BGO, GLNF, GLVO, GNFO, and RLO (manufactured by CIBA-GEIGY Corp.); Lionol Blue 700-10FG, 7481-G, FG-7397-G, FG-7400-G, GF-41703, FG-7405-G, FG-7408, and 7850G (manufactured by Toyo Ink Mfg. Co., Ltd.); Monastral Blue FGX (manufactured by ICI Ltd.), Sunfast Blue 15:4 and Spectra PACC Blue 15:4 (manufactured by Sun Chemical Co., Ltd.); Colortex Blue 510 and Sanyo Cyanine Blue 3008, J620, and KRG (manufactured by Sanyo Color Works, Ltd.); and Isol Phthalo Blue GB2P 372, Predichip Blue GB 1660, and Predisol Blue GBP-C 585, GFH-CAB 2660, and GP-C 9559 (manufactured by Kemisk Vaerk).

Examples of the yellow pigment for use in the present invention include C.I. Pigment Yellows 1, 3, 12, 13, 14, 17, 34, 35, 37, 55, 74, 81, 83, 93, 94, 95, 97, 108, 109, 110, 128, 137, 138, 139, 151, 153, 154, 155, 157, 166, 167, 168, 180, 185, and 193 and C.I. Pigment Oranges 13, 16, 20, and 36.

The yellow pigments most suitable for the present invention are those falling under C.I. Pigment Yellows 93, 94, 95, and 128. All of these pigments are organic disazo pigments developed by CIBA-GEIGY Corp., and are known as materials having many satisfactory properties. The molecular structures thereof are shown below.

Pigment Yellow 93

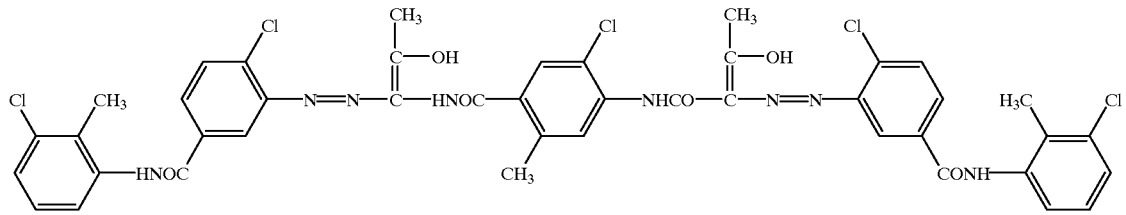

Pigment Yellow 94

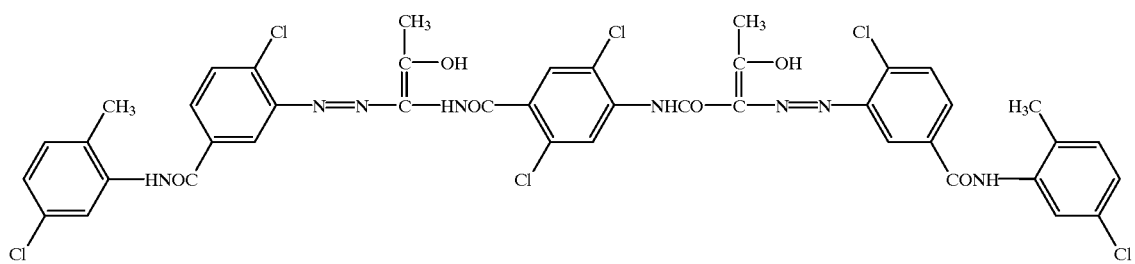

Pigment Yellow 95

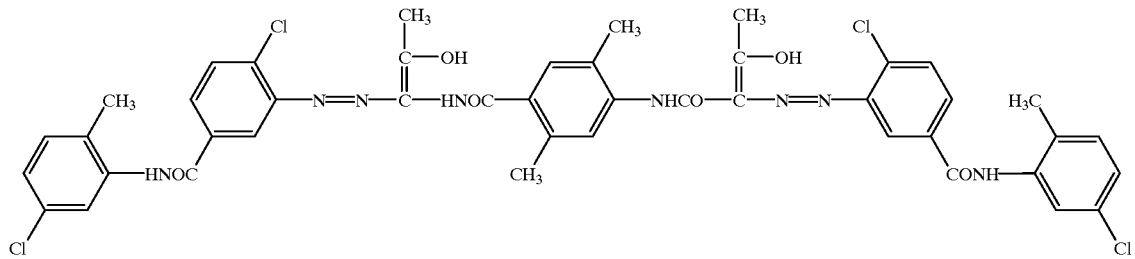

Pigment Yellow 128

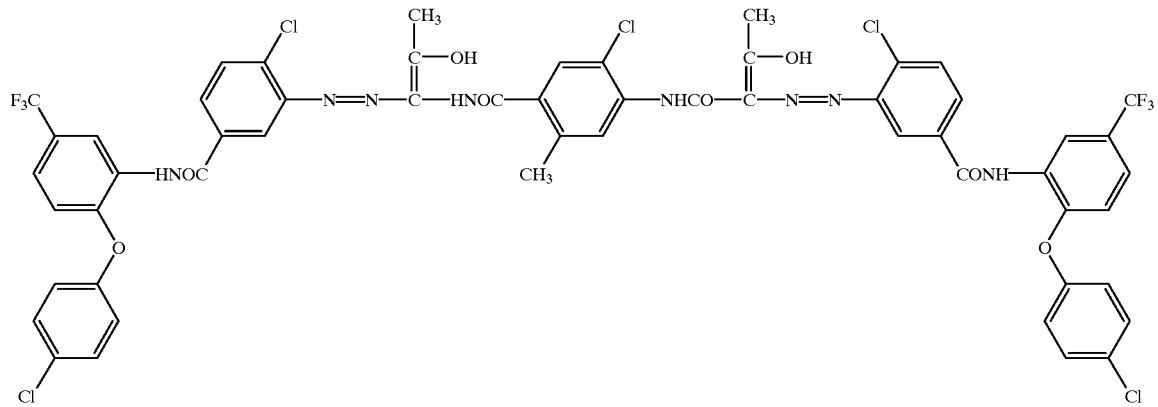

These pigments have the highest level of light resistance (color fastness to ultraviolet) among all yellow pigments, and are characterized by the nonuse of benzidine chloride, which poses a problem concerning labor safety and hygiene, in the production thereof. Examples of the pigments falling under these C.I. Pigments include the following untreated and treated pigments. However, the yellow pigments for use in the present invention should not be construed as being limited thereto.

Examples of the pigments falling under Pigment Yellow 93 include: Cromophtal Yellow 3GF, 3G-MC, 3GP, and 3G, Filofin Yellow 3G, Micranyl Yellow 3G-AG, 3G-AQ, 3G-K, and 4G-A, Versal Yellow 3G, Yellow EMD-387 and PEC-387, and Microlith Yellow 3G-WA (manufactured by CIBA-GEIGY Corp.); and Pigment Yellow 93 and Colortex Yellow UG379 (manufactured by Sanyo Color Works, Ltd.) Examples of the pigments falling under Pigment Yellow 94 include Cromophthal Yellow 6G (manufactured by CIBA-GEIGY Corp.). Examples of the pigments falling under Pigment Yellow 95 include: Cromophthal Yellow GR-P and GR, Micranyl Yellow GR-AG and GR-AQ (manufactured by CIBA-GEIGY Corp.); Versal Yellow GR (manufactured by Ostacolor); and Yellow EMD-388, PEC-388, and VC-388 (manufactured by Sumitomo Chemical Co., Ltd.). Examples of the pigments falling under Pigment Yellow 128 include Cromophthal Yellow 8GN and 8G and Micranyl Yellow 8GN-AG and 8GN-AQ (manufactured by CIBA-GEIGY Corp.).

Examples of the magenta pigment (magenta or red pigment) for use in the present invention include C.I. Pigment Reds 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 238, and 257, C.I. Pigment Violets 3, 19, 23, 29, 30, 37, 50, and 88, and C.I. Pigment Oranges 13, 16, 20, and 36. Of the pigments enumerated above, the most suitable pigments for the present invention are those falling under C.I. Pigment Red 122. These pigments are generally called quinacridone magenta, and are known as materials having many satisfactory properties. A molecular structure thereof is shown below.

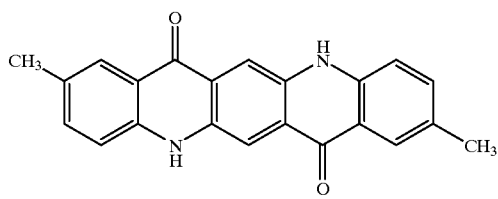

These pigments have the highest level of light resistance (color fastness to ultraviolet) among all pigments and have a magenta hue ideal for colorants. Examples of the pigments falling under C.I. Pigment Red 122 include the following untreated and treated pigments. However, the magenta pigments for use in the present invention should not be construed as being limited thereto.

The examples thereof include: Chrormofine Magenta 6878, 6880, 6886, and 6887 (manufactured by Dainichiseika Color & Chemicals Mfg. Co., Ltd.); Colortex Red UG276, UG515, and FSL-M (manufactured by Sanyo Color Works Ltd.); Liogen Magenta RR-122 (manufactured by Toyo Ink Mfg. Co., Ltd.); Toner Magenta E02, Hostaperm Pink E, EB, and E02, and PV Fast Pink E01 and E02 (manufactured by Hoechst AG); KET Red 310, 309, and 346 and Fastogen Super Magenta RG, RTS, R, RE-01, RE-02, RE-03, RE-03T, RTS-D, and RTS-D2 (manufactured by Dainippon Ink & Chemicals, Inc.); M-122 (manufactured by Morishita & Co., Ltd.); Monaprin Rubine 3BE and 3B, Monolite Red 3BE-HD, Monolite Rubine 3B, Polymon Red 6BED, and Vynamon Red 6B-FW (manufactured by ICI Ltd.); Sunfast Magenta 122 and Quinacridone Magenta 22 (manufactured by Sun Chemical Co., Ltd.); Red EPCF-117, HPA-117, and PEC-117 (manufactured by Sumitomo Chemical Co., Ltd.); Sandorin Brilliant Red 6BLN and Sandorin Magenta BLTE (manufactured by Clariant); and Aqua Plus Magenta Paste WR-9525, Quindo Magenta Presscake RV-6827 and 6831, and Quindo Magenta RV-6803, 6823, 6828, and 6832 (manufactured by Miles).

Besides being used directly, untreated pigments each can be used in the form of a master batch produced by dispersing the pigment beforehand in an appropriate resin, e.g., carnauba wax, an acrylic resin, or polyethylene, or in part of the ink vehicle, etc.

The vehicle materials for use in the hot-melt ink compositions of the present invention are not particularly limited. Examples thereof include monoamides, bisamides, tetraamides, polyamides, ester-amides, polyesters, poly (vinyl acetate), acrylic and methacrylic polymers, styrene polymers, ethylene/vinyl acetate copolymers, polyketones, silicone resins, coumarone resins, fatty acid esters, triglycerides, natural resins, and natural and synthetic waxes. One member or a mixture of two or more members selected from these can be used as a vehicle. However, the pigments especially suitable for use in the present invention do not always have a high coloring power (i.e., the color concentration of each ink at a given pigment concentration is not always high). In addition, it has been difficult to prepare a homogeneous dispersion of fine particles of any of these pigments, and such pigment dispersions having an elevated concentration tend to have an excessively high melt viscosity. Because of these drawbacks, it has conventionally been difficult to put those pigments to practical use in solid inks.

To eliminate the above problems, especially suitable vehicle materials for use in this invention among the above-enumerated vehicle materials are alcohol type wax materials. It has been found that alcohol type waxes exceptionally have excellent compatibility with organic pigments, in particular, with the pigments for use in the present invention, and are effective in relatively easily preparing a dispersion in which the pigment particles are in a disaggregated state. Although the reasons for this have not been elucidated, there is a possibility that such effects of alcohol type waxes might be based on some interaction between hydroxyl groups thereof and functional groups contained in the pigment molecule. The use of such an alcohol type wax is effective to attain both a high concentration capable of giving a sufficient chroma and a low melt viscosity during use which is suitable for ink-jet recording.

Especially preferred alcohol type waxes are alcohol/ethene polymers and waxes produced from a paraffin wax, microcrystalline wax or petrolatum through oxidation reaction. The polymers contain an alcohol having from 24 to 55 carbon atoms. The alcohol type waxes for use in the present invention desirably are completely saturated linear waxes having higher reactivity than the alcohols obtained by conventional fractional distillation. For example, completely saturated linear waxes in which hydroxyl groups are bonded evenly throughout the whole carbon chain are desirable.

Specific examples thereof include UNILIN 350, 425, 550, and 700 and, as ethoxylation products obtained therefrom, UNITHOX 420, 450, 480, 520, 550, 720, and 750 (manufactured by Toyo Petrolite Co., Ltd.). Desirable examples of alcohol-rich alcohol type waxes produced through oxidation reaction from a paraffin wax, microcrystalline wax or petrolatum include OX1949, OX020T, NPS59210, NPS9125, and NPS9035 (manufactured by Nippon Seiro Co., Ltd.). Examples thereof further include KOW, VLTN-4, VLTN-5, and VLTN-6 (manufactured by Kawaken Fine Chemical Co., Ltd.). Especially desirable among these are UNILIN 425, UNILIN 550, and OX1949.

These alcohol type waxes have a hydroxyl value of preferably from 20 to 150, more preferably about from 60 to 130. If an alcohol type wax having a hydroxyl value smaller than 20 is used, the ability thereof to disperse pigment particles is insufficient and the resultant ink is apt to suffer pigment sedimentation. If a wax having a hydroxyl value exceeding 150 is used, the excess polarization thereof causes pigment/vehicle separation. Measurement for determining hydroxyl value is herein made in accordance with the method provided for in ASTM E222 rev. With respect to the proportion of the hydroxyl value to the molecular weight in those alcohol type waxes, the value of (hydroxyl value)/(57×(molecular weight)) is preferably 1 or smaller, more preferably from 1 to 0.5.

The melt viscosity of the alcohol type wax is generally from 5 to 50 mPa·s, preferably from 5 to 30 mPa·s. If the melt viscosity thereof is lower than 5 mPa·s, pigment sedimentation cannot be prevented. If the melt viscosity thereof exceeds 50 mPa·s, it is difficult to conduct ink-jet recording.

In connection with the above viscosity requirement, it is desirable to select an alcohol type wax having about from 18 to 100 carbon atoms, preferably from 25 to 55 carbon atoms. If a wax having less than 18 carbon atoms is used, the dispersion stability of a pigment is insufficient because of the too low viscosity of the wax. If a wax having more than 100 carbon atoms is used, the wax has too high a viscosity, making ink-jet recording difficult. For the same reasons, the molecular weight of the wax to be used is preferably about from 200 to 1,500, more preferably from 300 to 700.

The melting point of the alcohol wax is preferably from 50 to 120° C., more preferably from 70 to 100° C., from the standpoints of stable ink ejection and storage stability of prints. Since the ink composition should have stability to heat and light, it especially preferably has an acid value of 12.0 or smaller and an iodine value of 3 or smaller. When an alcohol type wax satisfying these property requirements is used as the main component of an ink-jet ink, sufficient storage stability of prints is obtained.

The alcohol type waxes described above have satisfactory compatibility with vegetable waxes represented by candelilla wax, carnauba wax, castor wax, and Japan wax, and can be used as mixtures therewith. It is also possible to add other ingredients to the alcohol type waxes to improve properties. Examples of such optional ingredients include petroleum waxes such as paraffin waxes and microcrystalline waxes, polyethylene wax, saturated and unsaturated higher fatty acids such as stearic acid and behenic acid, ketones such as stearone and laurone, fatty acid ester amides, saturated or unsaturated fatty acid amides, fatty acid esters, castor oil, saturated and unsaturated fatty acid glycerides including hardened castor oil, and high-molecular resins such as rosin resins, hydrocarbon resins, amide resins, polyesters, poly(vinyl acetate), acrylic and methacrylic polymers, styrene polymers, ethylene/vinyl acetate copolymers, polyketones, silicones, and coumarone resins. The vehicle system for use in the present invention is applicable to a wide range of other pigments.

It is also important to stably disperse a pigment in a vehicle so as to prevent the pigment particles from sedimentation. In general, the dispersion stability of fine particles in a liquid is inversely proportional to the viscosity of the liquid as described in Kitahara, ed., Bunsan Gyoshu No Kaimei To Ohyo Gijutsu (Explication of Dispersion/Aggregation and Application Technology), Technosystem (1996) and in many other books. The essential subject is to attain both dispersion stability and a low viscosity. As can be presumed from the fact that the systems of the present invention can have a low viscosity, this invention has also attained sufficient pigment dispersion stability.

Suitable other inks or auxiliary colorants which can be used in combination with the ink compositions of the present invention are many pigments which can be satisfactorily dispersed in the vehicle used in the present invention and have excellent thermal stability.

Inks of other colors or cyan-supplementing colorants which can be used in combination with the cyan ink composition (a) of the present invention are not particularly limited. Examples thereof include the following organic or inorganic pigments given in Color Index.

Examples of optionally used magenta and red pigments include Pigment Reds 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 238, and 257, Pigment Violets 3, 19, 23, 29, 30, 37, 50, and 88, and Pigment Oranges 13, 16, 20, and 36.

Examples of optionally used green pigments include Pigment Greens 7, 26, 36, and 50. Examples of optionally used yellow pigments include Pigment Yellows 1, 3, 12, 13, 14, 17, 34, 35, 37, 55, 74, 81, 83, 93, 94, 95, 97, 108, 109, 110, 128, 137, 138, 139, 151, 153, 154, 155, 157, 166, 167, 168, 180, 185, and 193. Examples of optionally used black pigments include Pigment Blacks 7, 28, and 26. These optional pigments can be used according to purposes.

In the case where the ink composition (a) of the present invention which is suitable for a cyan pigment hue is applied to another hue, especially preferred pigments for use therein include Pigment Red 122, Pigment Yellows 93, 94, 95, and 128, and Pigment Black 7.

Inks of other colors or yellow-supplementing colorants which can be used in combination with the yellow ink composition (b) of the present invention are not particularly limited. Examples thereof include the following organic or inorganic pigments given in Color Index.

Examples of optionally used magenta and red pigments include Pigment Reds 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 238, and 257 and Pigment Violets 3, 19, 23, 29, 30, 37, 50, and 88. Examples of optionally used blue or cyan pigments include Pigment Blues 1, 15, 15:1, 15:2, 15:3, 15:4, 15:6, 16, 17-1, 22, 27, 28, 29, 36, and 60. Examples of optionally used green pigments include Pigment Greens 7, 26, 36, and 50. Examples of optionally used black pigments include Pigment. Blacks 7, 28, and 26. These optional pigments can be used according to purposes.

Especially preferred inks of other colors suitable for the hue of the yellow pigment used in the present invention include Pigment Red 122, Pigment Blue 15:4, and Pigment Black 7.

Inks of other colors or magenta-supplementing colorants which can be used in combination with the magenta ink composition (c) of the present invention are not particularly limited. Examples thereof include the following organic or inorganic pigments given in Color Index.

Examples of optionally used blue or cyan pigments include Pigment Blues 1, 15, 15:1, 15:2, 15:3, 15:4, 15:6, 16, 17-1, 22, 27, 28, 29, 36, and 60. Examples of optionally used green pigments include Pigment Greens 7, 26, 36, and 50. Examples of optionally used yellow pigments include Pigment Yellows 1, 3, 12, 13, 14, 17, 34, 35, 37, 55, 74, 81, 83, 93, 94, 95, 97, 108, 109, 110, 128, 137, 138, 139, 151, 153, 154, 155, 157, 166, 167, 168, 180, 185, and 193. Examples of optionally used black pigments include Pigment Blacks 7, 28, and 26. These optional pigments can be used according to purposes.

Especially preferred inks of other colors suitable for the hue of the magenta pigment used in the present invention include Pigment Yellows 93, 94, 95, and 128, Pigment Blue 15:4, and Pigment Black 7.

Soluble dyes (solvent dyes) can also be used in combination as colorants. Any desired colorant, e.g., oil-soluble dye, can be used as long as it is compatible with the other ink components. A mixture of two or more colorants can be suitably used for the purpose of color regulation, etc. Various additives can be incorporated into the ink compositions of the present invention in order to impart functions thereto. Examples thereof include surface-treating agents, surfactants, viscosity depressants, antioxidants, age resistors, crosslinking accelerators, ultraviolet absorbers, plasticizers, antiseptics, dispersants, and dyes.

In the cyan ink composition (a) of the present invention, the content of the pigment is preferably from 0.5 to 5% by weight, more preferably 0.7% by weight or higher, based on the whole cyan ink composition (a). The most preferred range thereof is from 0.7 to 2% by weight. If the pigment content is lower than 0.5% by weight, the ink has an insufficient chroma. If the pigment content exceeds 5% by weight, the ink viscosity is adversely influenced and the ink has a reduced chroma. As is well known, the addition amount of a pigment considerably influences the hue of the ink. In order for the ink composition to be used as a cyan ink, the hue angle $H^0$ thereof should be in the range of from 240° from 270°, and the maximum chroma $C^*$ thereof should be 45 or higher.

In the yellow ink composition (b) of the present invention, the content of the pigment is preferably from 1 to 5% by weight, more preferably from 1 to 4% by weight, based on the whole yellow ink composition (b). If the pigment content is lower than 1% by weight, the ink has an insufficient chroma. If the pigment content exceeds 5% by weight, ink viscosity is adversely influenced. As is well known, the addition amount of a pigment considerably influences the hue of the ink. In order for the ink composition to be used as a yellow ink, the hue angle $H^0$ thereof should be from 90° to 110°, and the chroma $C^*$ thereof should be 70 or higher.

In the magenta ink composition (c) of the present invention, the content of the pigment is preferably from 1 to 5% by weight, more preferably 2% by weight or higher, based on the whole magenta ink composition (c). The most preferred range thereof is from 2 to 4% by weight. If the pigment content is lower than 1% by weight, the ink has an insufficient chroma. If the pigment content exceeds 5% by weight, the ink viscosity is adversely influenced, and the ink has not a magenta hue but a highly reddish hue and has a reduced chroma. As is well known, the addition amount of a pigment considerably influences the hue of the ink. In order for the ink composition to be used as a magenta ink, the hue angle $H^0$ thereof should be in the range of from 340° to 360°, and the chroma $C^*$ thereof should be 60 or higher.

In the hot-melt ink composition for full color ink-jet printing of the present invention comprising the ink composition (a) to (c), the content of the pigments is preferably from 0.5 to 5% by weight, more preferably 0.7% by weight or higher, based on the whole ink composition. The most preferred range thereof is from 0.7 to 2% by weight. If the pigment content is lower than 0.5% by weight, the ink has an insufficient chroma. If the pigment content exceeds 5% by weight, the ink viscosity is adversely influenced and the ink has a reduced chroma. As is well known, the addition amount of a pigment considerably influences the hue of the ink. It is necessary to select a pigment addition amount so as to obtain suitable values of hue angle $H^0$ and maximum chroma $C^*$. There are cases where ink compositions containing the same pigment in the same amount have different color tones due to specific interaction between the vehicle and the pigment or when the ink compositions differ in pigment particle diameter. With respect to each ink composition of the present invention, the optimal pigment amount is determined so that the ink has the optimal chroma, hue, and light resistance described above while taking account of these influences.

A main feature of the present invention resides in that the ink compositions securely have a low melt viscosity, e.g., 15 mPa·s or lower, upon use even with a high concentration to provide a high chroma.

For mixing and dispersing the vehicle, pigment, and other ingredients described above, various known pulverizing or dispersing apparatuses can be used. Such apparatuses are classified into high-speed rotary mills, roller mills, vessel driving medium mills, medium stirring mills, jet mills, etc. Specific examples thereof include a high-speed disperser, impeller disperser, gate mixer, bead mill, sand mill, pearl mill, cobra mill, pin mill, molinex mill, agitating mill, universal mill, century mill, pressure mill, agitator mill, twin-screw extruder, two-roll mill, three-roll mill, niche mill, kneader, mixer, colloid mill, stone mill, KD mill, planetary mill, ball mill, paddle mixer, attritor, flow jet mixer, slasher mill, peg mill, microfluidizer, clearmix, rhinomill, homogenizer, pin bead mill, and horizontal bead mill.

The period for kneading varies depending on apparatuses. For the kneading, various methods for, e.g., preparing coating materials or inks or for resin coloring can be used. Examples thereof include a method in which all the ingredients are melt-kneaded at a time; a method in which a colorant is mixed with an appropriate ingredient to prepare a master batch having a high colorant concentration and this master batch is diluted; a method in which ingredients are successively added and mixed; and a flushing method in which a pigment is dispersed in a liquid and this dispersion is introduced into a solid phase.

Of the pulverizing or dispersing apparatuses enumerated above, a high-speed bead mill is preferably used in the present invention. Rotational speed is an especially important factor. In pulverization by a given method, lower rotational speeds result in lower pulverization efficiencies and hence necessitate a longer pulverization period. The rotational speed of the mill is preferably 1,000 rpm or higher, more preferably 2,000 rpm or higher, and particularly preferably from 2,000 to 4,000 rpm. If the rotational speed thereof is lower than 1,000 rpm, pulverization is insufficient and much time is necessary for ink production. Rotational speeds thereof exceeding 4,000 rpm are impractical because special equipment is necessary for maintaining such high-speed rotation at a high temperature. The material of the beads is not particularly limited, and suitable examples thereof include zircon, zirconia, and steel. Too large bead diameters bring about a high pulverization efficiency but result in insufficient particle size reduction, while too small bead diameters necessitate much time for kneading. Consequently, an appropriate bead diameter range is selected. Specifically, the bead diameters are preferably from 0.5 to 5 mm, more preferably from 0.5 to 2 mm.

It should be noted that phthalocyanine pigments are apt to undergo crystalline rearrangement during kneading due to heat, mechanical impacts and interaction with specific organic substances, and thus apt to cause considerably change in color tone, dispersibility, etc. In producing the ink of the present invention, this change should be taken in account when optimizing the hue and chroma thereof.

For preparing a high-quality ink for ink-jet recording, it is necessary to balance many important factors with one another. The ink compositions of the present invention satisfy several known requirements so as to be applied to hot-melt type ink-jet printers. Namely, the inks have sufficient hardness and stability at room temperature and are reliable with respect to storage before printing and image quality after printing. After adhesion to recording media, the inks have sufficient transparency and chroma and form thin even films to give prints of satisfactory image quality. These requirements are complicated, and cannot always be numerically expressed for the inks of the present invention. However, hot-melt inks having a relatively low melting point, for example, are typically apt to run and cause offset. It is necessary that prints when stored in a stacked state even at 40° C. do not undergo offset. Although an ink having a high melting point has a high viscosity, the melt viscosity thereof at the time of printing is preferably 50 mPa·s or lower, more preferably from 5 to 15 mPa·s. Too high viscosities thereof are undesirable in that a larger energy amount is necessary for ink ejection. Materials having too low viscosities have a problem concerning room-temperature storage stability. The viscosity at room temperature (25° C.) of each ink of the present invention is 10,000 mPa·s or higher.

With respect to bending properties of the resulting printed matter, the prints desirably stand at least testing with 5-mm diameter, especially testing with 3-mm diameter or a severer testing, in a mandrel test using a transparency film.

When used at an elevated ejection temperature, many inks can have a reduced viscosity within a range suitable for ejection. However, elevated ejection temperatures pose a problem concerning thermal stability. Specifically, upon long-term heating in an ink reservoir (ink chamber) or in a printing head, the ink may decompose or may corrode metallic materials in contact therewith. The optimal range of temperatures at which inks are melted in a printer during printing is from 100 to 150° C. from the standpoint of making the apparatus simple and inexpensive. The surface tension of the molten inks is desirably 30 mN/m or lower. The volume change thereof through transition from the molten to the solid state is desirably 10% or smaller.

The ink compositions according to the present invention can be used in conventionally known ink-jet printers in which ink droplets are ejected on demand, e.g., office printers, printers used for industrial marking, wide-format printers, printers for platemaking, and label printers, and in all types of printers in which the typical ink ejection operation is conducted.

Examples of the recording medium include papers, plastic films, capsules, jellies, metal foils, and fabrics. However, the recording media to which the ink compositions of the present invention are applicable should not be limited to these examples, and media of a wide range of shapes can be used because of the noncontact printing. Also usable are: a method in which ink droplets are first delivered to a receiving material and then transferred to a recording medium; and a recording method involving treatment with a pressing/heating apparatus.

The present invention will be explained below in more detail by reference to the following Examples, but the invention should not be construed as being limited thereto.

EXAMPLE 1-1

A mixture of 80 wt % alcohol type wax (trade name, UNILIN 350; manufactured by Toyo Petrolite Co., Ltd.) and 20 wt % another alcohol type wax (OX1949, manufactured by Nippon Seiro Co., Ltd.) was used as a vehicle. A cyan pigment (trade name, Fastogen Blue 5410G; manufactured by Dainippon Ink & Chemicals, Inc.) falling under C.I. Pigment Blue 15:4 was added as a colorant to the vehicle in various concentrations ranging from 0.5 to 5 wt % based on all ingredients. The resultant mixtures each was kneaded with heating by means of a bead mill (Motor Mill M-250, manufactured by Eiger Corp.; beads, 1-mm diameter zircon) at 130° C. and a rotational speed of 2,500 rpm until a homogeneous molten mixture was obtained. Subsequently, the molten mixtures were filtered with heating and pressurizing to remove impurities, etc., and then allowed to cool at room temperature. Thus, homogeneous cyan ink compositions were obtained.

These ink compositions were printed on a recording medium by hand or with an ink-jet printer (JOLT SJO1A, manufactured by Hitachi Koki Co., Ltd.). The resultant prints were examined with a color difference meter (Σ90, manufactured by Nippon Denshoku Kogyo K.K.) to measure the chroma $C^*$ and hue $H^0$ thereof. The results obtained are shown in FIG. 1-1.

The results show that the pigment concentrations lower than 0.7 wt % resulted in too low chromas and that desirable values of chroma $C^*$ not below 45 were obtained when the pigment concentration was not lower than 0.7 wt %. The pigment concentration range in which the hue angle $H^0$ was in the desirable range of from 240° to 270° was from 0.7 to 3 wt %.

The melt viscosity of the ink composition having a pigment concentration of 1 wt % was measured at 130° C. with a rotational viscometer (Model EDL, manufactured by Tokimec Inc.), and was found to be about 12 mPa·s. The print obtained with this ink composition having a pigment concentration of 1.0 wt % was subjected to a 100-hour irradiation test with a xenon lamp tester (SunChex, manufactured by Atlas Corp.) regulated so as to have a wavelength of 340 nm and a luminous energy of 0.35 W/m$^2$ (sample temperature, 60° C.). As a result, the print exhibited satisfactory light resistance with a color difference ΔE of 0.8.

EXAMPLE 1-2

An alcohol type wax (trade name, UNILIN 425; manufactured by Toyo Petrolite Co., Ltd.) was used as a vehicle. A cyan pigment (trade name, Lionol Blue FG-7400G; manufactured by Toyo Ink Mfg. Co., Ltd.; Example 1-2) falling under Pigment Blue 15:4 or a cyan pigment (trade name, Lionol Blue FG-7330; manufactured by Toyo Ink Mgf Co., Ltd.; Comparative Example 1-1) falling under Pigment Blue 15:3 was added as a colorant to the vehicle in an amount of 1.0 wt % based on all ingredients. The resultant mixtures each in an amount of 300 g were separately kneaded with heating by means of the same apparatus as in Example 1-1 (Motor Mill) until homogeneous molten mixtures were obtained (3 hours). Subsequently, the molten mixtures were filtered with heating and pressurizing to remove impurities, etc., and then allowed to cool at room temperature. Thus, homogeneous cyan ink compositions were obtained. The rotational speed of Motor Mill was 2,500 rpm.

TABLE 1-1

|  | Comparative Example 1-1 | Example 1-2 |
| --- | --- | --- |
| Colorant | Lionol Blue FG7330 | Lionol Blue FG-7400G |
| Color Index No. | Pigment Blue 15:3 | Pigment Blue 15:4 |
| Colorant amount (wt %) | 1.0 | |
| Vehicle | UNILIN 425 | |
| Melt viscosity (mPa · s) | 14 | 11 |

TABLE 1-1-continued

|  | Comparative Example 1-1 | Example 1-2 |
|---|---|---|
| Ink separation (%) (130° C./3 d) | 41 | 0 |
| Chroma C* | 42 | 53 |
| Hue angle H⁰ (°) | 243 | 253 |
| ΔE* (xenon lamp, 100 h) | unable to be measured because printing was impossible | 1.0 |

The melt viscosities of the ink compositions at 130° C. were 14 mPa·s (Comparative Example 1-1) and 11 mPa·s (Example 1-2). As Table 1-1 shows, the ink containing the pigment falling under Pigment Blue 15:4 had satisfactory dispersion stability, satisfactory cyan color characteristics with a C* of 53 and an H⁰ of 253°, and satisfactory light resistance with a ΔE* of 1.0. In contrast, the ink containing the pigment falling under Pigment Blue 15:3 had insufficient properties because of the extremely poor dispersion stability.

The above-prepared ink containing the pigment falling under Pigment Blue 15:4 (Example 1-2) was subjected to the light resistance test with a xenon lamp over longer periods. As a result, the values of ΔE* thereof were 1.0 (300 h), 1.7 (500 h), and 2.7 (700 h). This ink of the present invention was thus ascertained to have excellent light resistance.

EXAMPLE 1-3

A mixture of 50 wt % alcohol type wax (trade name, UNILIN 550; manufactured by Toyo Petrolite Co., Ltd.) and 50 wt % ester-amide (trade name, Kawaslip SA; manufactured by Kawaken Fine Chemicals Co., Ltd.) was used as a vehicle. A cyan pigment (Cyanine Blue 4933GN-EP, manufactured by Dainichiseika Color & Chemicals Mfg. Co., Ltd.) falling under Pigment Blue 15:4 was added as a colorant to the vehicle in an amount of 0.7 w % based on all ingredients. The resultant mixture in an amount of 300 g was kneaded with heating by means of the same apparatus as in Example 1-1 (Motor Mill), a stirring mill (a dry/wet mill manufactured by Kurimoto, Ltd.), or an attritor (Type MA01SC, manufactured by Mitsui Mining Co., Ltd.) until a homogeneous molten mixture was obtained (3 hours) Subsequently, the molten mixtures were filtered with heating and pressurizing to remove impurities, etc., and then allowed to cool at room temperature. Thus, homogeneous cyan ink compositions (Example 1-3) and ink analogues (Comparative Examples 1-2) were obtained. The rotational speed of the stirring mill was 450 rpm, and those of the attritor were 100 and 300 rpm. The rotational speeds of the Motor Mill were 2,000, 2,500, and 4,000 rpm.

The inks and ink analogues obtained each was placed in a 12-mm diameter test tube and allowed to stand at 135° C. for 3 days to examined the ink for layer separation (the proportion of a separated layer is shown in terms of %). Furthermore, the melt viscosity of each composition at 130° C. was measured in the same manner as in Example 1-1.

TABLE 1-2

|  | Comparative Example 1-2 | Example 1-3 |
|---|---|---|
| Colorant | Cyanine Blue 4933GN-EP | |
| Vehicle | Unilin 550 + Kawaslip SA | |
| Colorant | 0.7 | |

TABLE 1-2-continued

|  | Comparative Example 1-2 | | | Example 1-3 | | |
|---|---|---|---|---|---|---|
| concentration (%) | | | | | | |
| Mixing/stirring apparatus | attritor | | stirring mill | bead mill | | |
| Rotational speed (rpm) | 100 | 300 | 450 | 2000 | 2500 | 4000 |
| Kneading period (h) | | 6 | | | 3 | |
| Ink separation (%) | 50 | 12 | 5 | 0 | 0 | 0 |
| Melt viscosity (mPa · s) | —# | 9 | 10 | 11 | 12 | 13 |
| Chroma C* | — | 43 | 45 | 50 | 55 | 60 |
| Hue angle H⁰ (°) | — | 240 | 243 | 250 | 260 | 262 |

: unable to be measured because of ink separation

The results obtained are shown in Table 1-2. The inks produced by the processes according to the present invention each had a viscosity of 15 mPa·s or lower and satisfactory dispersion stability. In contrast, the ink analogues, which were produced at low rotational speeds, each had poor dispersion stability and underwent considerable ink layer separation.

EXAMPLE 1-4

A mixture of 50 wt % alcohol type wax (trade name, OX020T; manufactured by Nippon Seiro Co., Ltd.), 30 wt % Kawaslip SA, and 20 wt % poly(vinyl acetate) (trade name, AC401; manufactured by Allied Signal Corp.) was used as a vehicle. A treated cyan pigment (Lionol Blue FG7405G, manufactured by Toyo Ink Mfg. Co., Ltd.) falling under Pigment Blue 15:4, a cyan pigment (Lionol Blue FG7350, manufactured by Toyo Ink Mfg. Co., Ltd.) falling under Pigment Blue 15:3 as a comparative pigment, or a treated cyan pigment (Colortex Blue P908, manufactured by Sanyo Color Works, Ltd.) falling under Pigment Blue 15:1 as another comparative pigment was added as a colorant to the vehicle in an amount of 1.0 wt % based on all ingredients. The resultant mixtures each was kneaded with heating in the same manner as in Example 1-1 until a homogeneous molten mixture was obtained (about 6 hours). Subsequently, the molten mixtures were filtered with heating and pressurizing to remove impurities, etc., and then allowed to cool at room temperature. Thus, a homogeneous cyan ink composition (Example 1-4) and two ink analogues (Comparative Example 1-3) were obtained.

TABLE 1-3

|  | Comparative Example 1-3 | Example 1-4 | |
|---|---|---|---|
| Colorant | Colortex Blue P908 | Lionol Blue FG7350 | Lionol Blue FG7405G |
| Color Index No. | Pigment Blue 15:1 | Pigment Blue 15:3 | Pigment Blue 15:4 |
| Ink separation (%) (135° C./3 d) | 31.8 | 17.6 | 0 |
| Melt viscosity (mPa · s) (130° C.) | 18.0 | 13.6 | 10.4 |
| Chroma C* | 40.5 | 47.1 | 55.3 |
| Hue angle H⁰ (° C.) | 215 | 251 | 262 |

The compositions obtained were subjected to the same evaluations as in Example 1-1. The results obtained are shown in Table 1-3. The ink containing the pigment falling under Pigment Blue 15:1 had an excessively greenish hue outside the optimal cyan hue range. The ink containing the pigment falling under Pigment Blue 15:3 was insufficient in dispersion stability and chroma. In contrast, the print obtained with the ink according to the present invention which contained the pigment falling under Pigment Blue 15:4 exhibited satisfactory light resistance with a color difference ΔE of 3 or smaller in the same xenon lamp irradiation test (100 h) as in Example 1-1.

EXAMPLE 1-5

A mixture of 50 wt % UNILIN 550 and 50 wt % OX1949 (manufactured by Nippon Seiro Co., Ltd.) was used as a vehicle. Cyan pigment Cyanine Blue 4927GP (manufactured by Dainichiseika Color & Chemicals Mfg. Co., Ltd.), falling under Pigment Blue 15:4, was added as a colorant to the vehicle in an amount of 1 wt %. The resultant mixture in an amount of 500 g was kneaded with heating at 130° C. by means of Motor Mill until a homogeneous molten mixture was obtained (about 6 hours). Subsequently, the molten mixture was filtered with heating and pressurizing to remove impurities, etc., and then allowed to cool at room temperature to obtain a homogeneous cyan ink composition. This ink composition was heated to 130° C. to measure the melt viscosity thereof five times in the same manner as in Example 1-1. The average of the five found values was. 10 mPa·s.

This ink was placed in an ink-jet printer in the same manner as in Example 1-1 and ejected from all nozzles. The ink in the printer was allowed to stand in a molten state for 3 days and then ejected. As a result, the ink was ascertained to be ejected from all nozzles satisfactorily. Furthermore, the ink was placed in a test tube having a diameter of 12 mm and allowed to stand at 135° C. in a molten state in the same manner as in Example 1-1. As a result, the dispersion underwent no separation in one week. In the same light resistance test as in Example 1-1, the print obtained with the ink had a ΔE* of 3 or smaller.

Comparative Example 1-4

A vehicle/pigment mixture having the same composition as in Example 1-1 was kneaded with heating (2 hours) by means of a stirring mixer (Labo Stirrer LR-41B, manufactured by Yamato K. K.; rotational speed, 100 rpm) to prepare a cyan ink analogue. This hot-melt ink analogue was heated to 130° C. to measure the melt viscosity thereof five times with a rotational viscometer in the same manner as in Example 1-1. The average of the five found values was 9 mPa·s.

This ink analogue was placed in an ink-jet printer in the same manner as in Example 1-1, and was ascertained to be ejected continuously. The ink analogue in the printer was allowed to stand in a molten state for 3 days and then used for printing again. In this printing operation, the number of nozzles from which ejection was impossible was counted. As a result, about 50% (50 nozzles) of all nozzles suffered an ejection failure. Furthermore, the ink analogue was placed in a test tube having a diameter of 12 mm and allowed to stand at 135° C. in a molten state in the same manner as in Example 1-1. After 1-week standing, an upper layer containing no colorant had appeared, which accounted for about 80% of the whole melt. Thus, the melt was found to separate into two layers.

Comparative Example 1-5

A monoamide (Kemamide S-180, manufactured by Witco Corp.) was used as a vehicle. Cyan pigment KET Blue 111 (manufactured by Dainippon Ink & Chemicals, Inc.) was added as a colorant to the vehicle in an amount of 1.5 wt %. The resultant mixture in an amount of 500 g was kneaded with heating at 130° C. by means of a homogenizer (HG30, manufactured by Hitachi Koki Co., Ltd.) until a homogeneous mixture was obtained (about 6 hours). Subsequently, the molten mixture was filtered with heating and pressurizing to remove impurities, etc., and then allowed to cool at room temperature to obtain a homogeneous cyan ink analogue.

This ink analogue was heated to 130° C. to measure the melt viscosity thereof five times with a rotary viscometer in the same manner as in Example 1-1. The average of the five found values was 20 mPa·s. This ink analogue was placed in an ink-jet printer and examined for suitability for ejection in the same manner as in Example 1-1. In the initial stage, the ink analogue was ejected from all nozzles. However, when the ink analogue was allowed to stand in a molten state for 3 days and then used for printing, about 20% (20 nozzles) of all nozzles suffered an ejection failure even when a voltage higher than the ordinary value was applied thereto. Furthermore, the ink analogue was placed in a test tube having a diameter of 12 mm and allowed to stand at 135° C. in a molten state in the same manner as in Example 1-1. On the second day, an upper layer containing no colorant appeared, which accounted for about 50% of the whole melt. Thus, the melt was found to separate into two layers.

The hot-melt cyan ink composition for ink-jet printing of the present invention attains both dispersion stability and suitability for ejection unlike conventional hot-melt ink compositions containing a phthalocyanine blue pigment as a colorant. Consequently, it has become possible to produce an ink which has better light resistance and a wider range of applications than conventional inks containing a cyan pigment as a colorant.

EXAMPLE 2-1

A mixture of 80 wt % alcohol type wax (trade name, UNILIN 350; manufactured by Toyo Petrolite Co., Ltd.) and 20 wt % another alcohol type wax (OX1949, manufactured by Nippon Seiro Co., Ltd.) was used as a vehicle. A yellow pigment (trade name, Cromophthal Yellow 6G; manufactured by CIBA-GEIGY Corp.) falling under C.I. Pigment Yellow 94 was added as a colorant to the vehicle in various concentrations ranging from 0.5 to 6 wt % based on all ingredients. The resultant mixtures each was kneaded with heating by means of a homogenizer (HG30, manufactured by Hitachi Koki Co., Ltd.) at 130° C. and a rotational speed of 10,000 rpm until a homogeneous molten mixture was obtained. Subsequently, the molten mixtures were filtered with heating and pressurizing to remove impurities, etc., and then allowed to cool at room temperature. Thus, homogeneous yellow ink compositions were obtained.

Figures 1, 2:
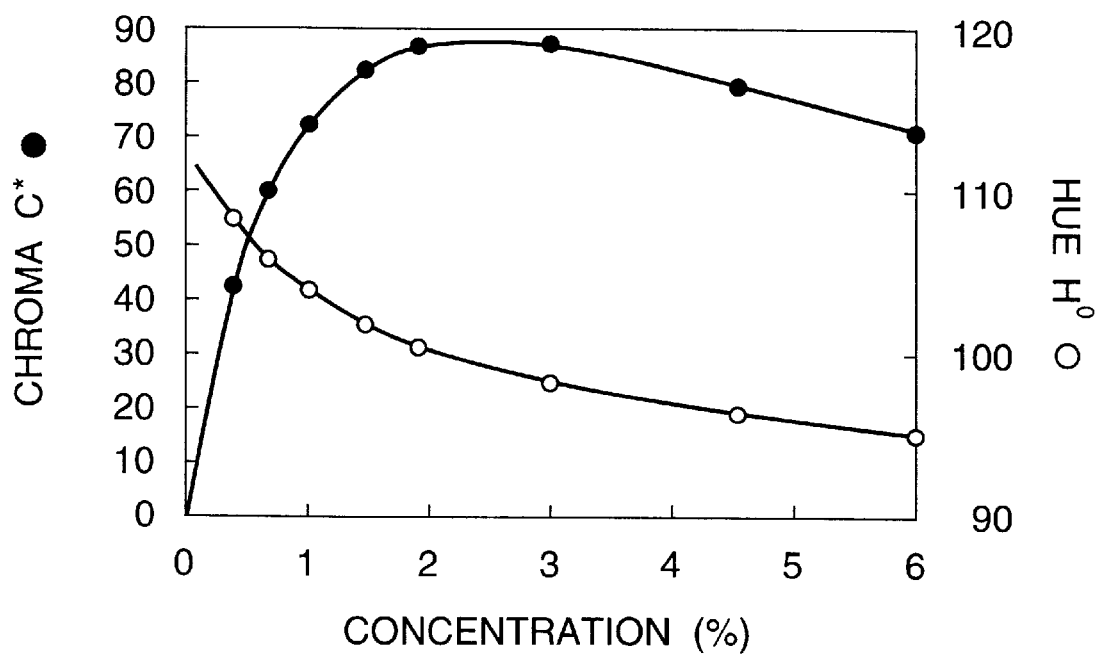

These inks were printed on a recording medium by hand or with an ink-jet printer (JOLT SJO1A, manufactured by Hitachi Koki Co., Ltd.). The resultant prints were examined with a color difference meter (Σ90, manufactured by Nippon Denshoku Kogyo K. K.) to measure the chroma C* and hue $H^0$ thereof. The results obtained are shown in FIG. 2-1.

The results show that the pigment concentrations lower than 1 wt % resulted in too low chromas and that desirable values of chroma C* not below 70 were obtained when the pigment concentration was not lower than 1 wt %. At all the various pigment concentrations, the hue angle $H^0$ was almost within the desirable range of from 110° to 90°. The hue angle $H^0$ corresponding to the maximum chroma was within this range.

The melt viscosity of the ink composition having a pigment concentration of 2 wt % was measured at 130° C.

with a rotational viscometer (Model EDL, manufactured by Tokimec Inc.), and was found to be about 14 mPa·s. The print obtained with this ink composition having a pigment concentration of 2 wt % was subjected to a 100-hour irradiation test with a xenon lamp tester (SunChex, manufactured by Atras Corp.) regulated so as to have a wavelength of 340 nm and a luminous energy of 0.35 W/m$^2$ (sample temperature, 60° C.). As a result, the print exhibited satisfactory light resistance with a color difference ΔE of 1.6.

EXAMPLE 2-2

An alcohol type wax (trade name, UNILIN 425; manufactured by Toyo Petrolite Co., Ltd.) was used as a vehicle. A yellow pigment (trade name, Pigment Yellow 93; manufactured by Sanyo Color Works, Ltd.; Example 2-2) falling under Pigment Yellow 93 or a yellow pigment (trade name, KET Yellow 403; manufactured by Dainippon Ink & Chemicals Inc.; Comparative Example 2-1) falling under Pigment Yellow 17 was added as a colorant to the vehicle in an amount of 1.5 wt % based on all ingredients. The resultant mixtures each in an amount of 300 g were separately kneaded with heating by means of a homogenizer (Clearmix, manufactured by Seiko EG & G) until homogeneous molten mixtures were obtained (3 hours) . Subsequently, the molten mixtures were filtered with heating and pressurizing to remove impurities, etc., and then allowed to cool at room temperature. Thus, homogeneous yellow ink compositions were obtained. The rotational speed of the Motor Mill was 15,000 rpm. The melt viscosities of the ink compositions at 130° C. were 12 mPa·s (Example 2-2) and 14 mPa·s (Comparative Example 2-1).

TABLE 2-1

|  | Comparative Example 2-1 | Example 2-2 |
| --- | --- | --- |
| Colorant | KET Yellow 403 | Pigment Yellow 93 |
| Color Index No. | Pigment Yellow 17 | Pigment Yellow 93 |
| Colorant amount (wt %) | 1.5 | |
| Vehicle | UNILIN 425 | |
| Melt viscosity (mPa · s) | 14 | 12 |
| Ink separation (%) (130° C./3 d) | 12 | 0 |
| C* | 80 | 85 |
| H° (°) | 98 | 100 |
| ΔE* (xenon lamp, 100 h) | 7 | 1.5 |

The inks obtained each was placed in a 12-mm diameter test tube and allowed to stand in a molten state at 135° C. for 3 days to examine each ink for layer separation (the proportion of a separated layer is shown in terms of %). As Table 2-1 shows, the ink containing the pigment falling under Pigment Yellow 93 (Example 2-2) had satisfactory yellow color characteristics with a C* of 85 and an H° of 100° and satisfactory light resistance with a ΔE* of 1.5. In contrast, the ink containing the pigment falling under Pigment Yellow 17 (Comparative Example 2-1) were relatively insufficient in dispersion stability and light resistance, although satisfactory in color characteristics.

The above-prepared ink containing the pigment falling under Pigment Yellow 93 was subjected to the light resistance test with a xenon lamp over longer periods. As a result, the values of ΔE* thereof were 1.8 (200 h), 3.3 (300 h), and 4.7 (400 h). This ink of the present invention was thus ascertained to have excellent light resistance.

EXAMPLE 2-3

A mixture of 50 wt % alcohol type wax (trade name, UNILIN 550; manufactured by Toyo Petrolite Co., Ltd.) and 50 wt % ester-amide (trade name, Kawaslip SA; manufactured by Kawaken Fine Chemicals Co., Ltd.) was used as a vehicle. A yellow pigment (trade name, Cromophthal Yellow GR-P; manufactured by CIBA-GEIGY Corp.) falling under Pigment Yellow 95 was added as a colorant to the vehicle in an amount of 2.0 w % based on all ingredients. The resultant mixture in an amount of 300 g was kneaded with heating by means of the same apparatus as in Example 2-1 at each of various rotational speeds of 100, 500, 1,000, 2,000, 10,000 and 20,000 rpm until a homogeneous molten mixture was obtained (3 hours). Subsequently, the molten mixtures were filtered with heating and pressurizing to remove impurities, etc., and then allowed to cool at room temperature. Thus, homogeneous yellow ink compositions (Example 2-3) and ink analogues (Comparative Example 2-2) were obtained. The ink compositions and ink analogues obtained were examined for dispersion stability and melt viscosity.

TABLE 2-2

|  | Comparative Example 2-2 |  |  | Example 2-3 |  |  |
| --- | --- | --- | --- | --- | --- | --- |
| Colorant | Cromophthal Yellow GR-P | | | | | |
| Vehicle | Unilin 550 + Kawaslip SA | | | | | |
| Rotational speed (rpm) | 100 | 500 | 1000 | 2000 | 10000 | 20000 |
| Kneading period (h) | | | | 3 | | |
| Ink separation (%) | about 70 | about 50 | about 30 | 0 | 0 | 0 |
| Melt viscosity (mPa · s) | — | — | —# | 13 | 15 | 15 |

: unable to be measured because of ink separation (appeared to have the same viscosity as the vehicle)

The results obtained are shown in Table 2-2. The ink compositions produced by the processes according to the present invention each had a viscosity of 15 mPa·s or lower and satisfactory dispersion stability. In contrast, the ink analogues, which were produced at low rotational speeds, each had poor dispersion stability and underwent considerable ink layer separation.

EXAMPLE 2-4

A mixture of 50 wt % alcohol type wax (trade name, OX020T; manufactured by Nippon Seiro Co., Ltd.), 30 wt % Kawaslip SA, and 20 wt % poly(vinyl acetate) (trade name, AC401; manufactured by Allied Chemical Corp.) was used as a vehicle. Yellow pigments (trade name, Cromophthal Yellow 8GN and 8G; manufactured by CIBA-GEIGY Corp.) falling under C.I. Pigment Yellow 128 each was added as a colorant to the vehicle in an amount of 2 wt % based on all ingredients. The resultant mixtures each was kneaded with heating in the same manner as in Example 2-1 until a homogeneous molten mixture was obtained (about 6 hours). Subsequently, the molten mixtures were filtered with heating and pressurizing to remove impurities, etc., and then allowed to cool at room temperature. Thus, homogeneous yellow ink composition were obtained.

The ink compositions obtained were subjected to the same evaluations as in Example 2-1. As a result, the inks exhibited satisfactory dispersion stability (0%) and a satisfactory melt viscosity (about 14 mPa·s). The prints obtained therewith in the same manner as in Example 2-1 had a C* of 83 and an H° of 110. Furthermore, the prints exhibited satisfactory light resistance with a color difference ΔE of 5 or smaller in the same xenon lamp irradiation test (100 h) as in Example 2-1.

EXAMPLE 2-5

A mixture of 50 wt % UNILIN 550 and 50 wt % OX1949 (manufactured by Nippon Seiro Co., Ltd.) was used as a vehicle. A treated yellow pigment (TVP24, manufactured by Toyo Ink Mfg. Co., Ltd.) falling under Pigment Yellow 95 was added as a colorant to the vehicle in an amount of 3 wt %. The resultant mixture in an amount of 500 g was kneaded with heating at 130° C. by means of a homogenizer until a homogeneous molten mixture was obtained (about 6 hours). Subsequently, the molten mixture was filtered with heating and pressurizing to remove impurities, etc., and then allowed to cool at room temperature to obtain a homogeneous yellow ink composition. This ink composition was heated to 130° C. to measure the melt viscosity thereof five times in the same manner as in Example 2-1. The average of the five found values was 15 mPa·s.

This ink was placed in an ink-jet printer in the same manner as in Example 2-1 to conduct printing. As a result, the print obtained had a chroma $C^*$ of 70 and a hue angle $H^0$ of 90°. In the same light resistance test as in Example 2-1, the print had a $\Delta E^*$ of about 2.

Comparative Example 2-3

A vehicle/pigment mixture having the same composition as in Example 2-1 was kneaded with heating (2 hours) by means of a stirring mixer (Labo Stirrer LR-41B, manufactured by Yamato K. K.; rotational speed, 100 rpm) to prepare a yellow ink analogue. This ink analogue was heated to 130° C. to measure the melt viscosity thereof five times with a rotational viscometer in the same manner as in Example 2-1. The average of the five found values was 9 mPa·s.

This ink analogue was placed in an ink-jet printer in the same manner as in Example 2-1, and was ascertained to be ejected continuously. The ink analogue in the printer was allowed to stand in a molten state for 3 days and then used for printing again. In this printing operation, the number of nozzles from which ejection was impossible was counted. As a result, about 50% (50 nozzles) of all nozzles suffered an ejection failure. Furthermore, the ink analogue was placed in a test tube having a diameter of 12 mm and allowed to stand at 135° C. in a molten state in the same manner as in Example 2-1. After 1-week standing, an upper layer containing no colorant had appeared, which accounted for about 80% of the whole melt. Thus, the melt was found to separate into two layers.

Comparative Example 2-4

A vehicle consisting only of a monoamide (Kemamide) was used. Yellow pigment Micranyl Yellow 3G-AG (manufactured by CIBA-GEIGY Corp.) was added as a colorant to the vehicle in an amount of 1.5 wt %. The resultant mixture in an amount of 500 g was kneaded with heating at 130° C. by means of a homogenizer until a homogeneous mixture was obtained (about 6 hours). Subsequently, the molten mixture was filtered with heating and pressurizing to remove impurities, etc., and then allowed to cool at room temperature to obtain a homogeneous yellow ink analogue.

This ink analogue was heated to 130° C. to measure the melt viscosity thereof five times with a rotary viscometer in the same manner as in Example 2-1. The average of the five found values was 20 mPa·s. This ink analogue was placed in an ink-jet printer and examined for suitability for ejection in the same manner as in Example 2-1. In the initial stage, the ink analogue was ejected from all nozzles. However, when the ink analogue was allowed to stand in a molten state for 3 days and then used for printing, about 30% (30 nozzles) of all nozzles suffered an ejection failure even when a voltage higher than the ordinary value was applied thereto.

Furthermore, the ink analogue was placed in a test tube having a diameter of 12 mm and allowed to stand at 135° C. in a molten state in the same manner as in Example 2-1. On the second day, an upper layer containing no colorant appeared, which accounted for about 18% of the whole melt. Thus, the melt was found to separate into two layers.

The hot-melt yellow ink composition for ink-jet printing of the present invention attains both dispersion stability and suitability for ejection unlike conventional hot-melt ink compositions containing a highly light-resistant yellow pigment as a colorant. Consequently, it has become possible to produce an ink which has better light resistance and a wider range of applications than conventional inks containing a yellow pigment as a colorant.

EXAMPLE 3-1

A mixture of 80 wt % alcohol type wax (trade name, UNILIN 350; manufactured by Toyo Petrolite Co., Ltd.) and 20 wt % another alcohol type wax (OX1949, manufactured by Nippon Seiro Co., Ltd.) was used as a vehicle. A magenta pigment (trade name, KET Red 309; manufactured by Dainippon Ink & Chemicals, Inc.) falling under C.I. Pigment Red 122 was added as a colorant to the vehicle in various concentrations ranging from 0.5 to 5 wt % based on all ingredients. The resultant mixtures each was kneaded with heating by means of a bead mill (Motor Mill M-250, manufactured by Igor Corp.; beads, 1-mm diameter zircon) at 130° C. and a rotational speed of 2,500 rpm until a homogeneous molten mixture was obtained. Subsequently, the molten mixtures were filtered with heating and pressurizing to remove impurities, etc., and then allowed to cool at room temperature. Thus, homogeneous magenta ink compositions were obtained.

Figures 1, 3:
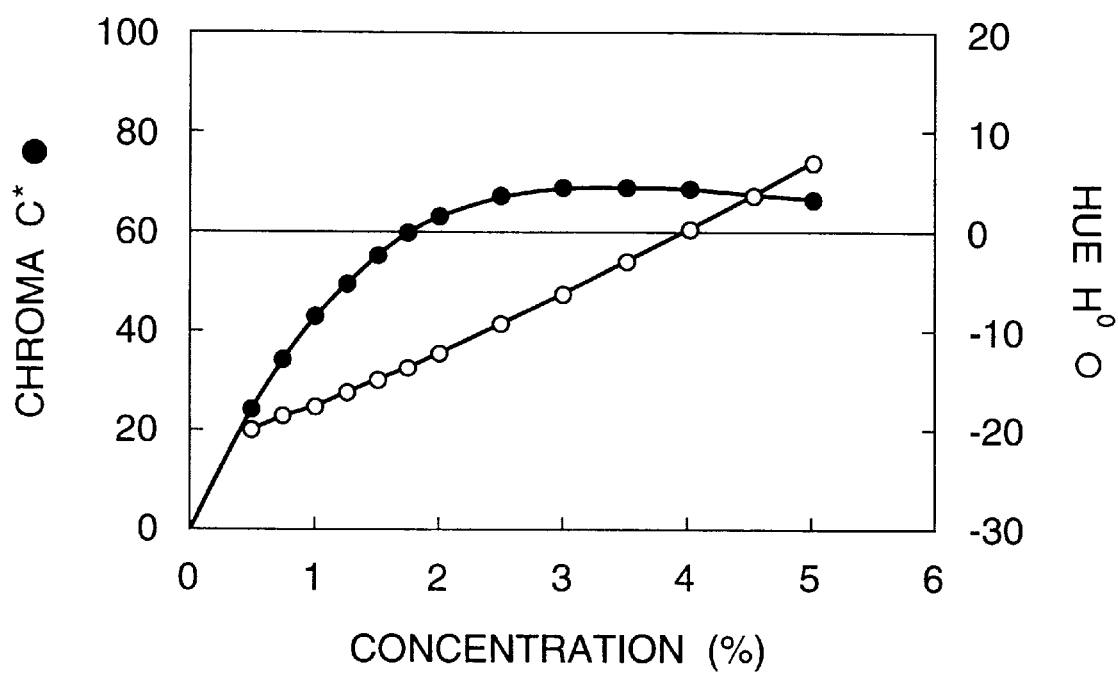

These ink compositions were used to conduct printing by hand or with an ink-jet printer (JOLT SJO1A, manufactured by Hitachi Koki Co., Ltd.). The resultant prints were examined with a color difference meter ($\Sigma$90, manufactured by Nippon Denshoku Kogyo K. K.) to measure the chroma $C^*$ and hue $H^0$ thereof. The results obtained are shown in FIG. 3-1.

The results show that the pigment concentrations lower than 2 wt % resulted in too low chromas and that desirable values of chroma $C^*$ not below 60 were obtained when the pigment concentration was not lower than 1.7 wt %. In this case, the maximum chroma was about 70, which was obtained when the pigment concentration was in the range of from 2.5 to 3.5 wt %. On the other hand, the hue angle $H^0$ gradually changed toward red (negative→positive), and was in the desirable range of from 340° to 360° when the pigment concentration was not higher than about 4 wt %.

The melt viscosity of the ink composition having a pigment concentration of 2 wt % ($H^0$, about 348°) was measured at 130° C. with a rotational viscometer (Model EDL, manufactured by Tokimec Inc.), and was found to be about 12 mPa·s. The print obtained with this ink composition having a pigment concentration of 2.0 wt % was subjected to a 100-hour irradiation test with a xenon lamp tester (SunChex, manufactured by Atras Corp.) regulated so as to have a wavelength of 340 nm and a luminous energy of 0.35 W/m$^2$ (sample temperature, 60° C.). As a result, the print exhibited satisfactory light resistance with a color difference $\Delta E$ of 2.3.

EXAMPLE 3-2

An alcohol type wax (trade name, UNILIN 425; manufactured by Toyo Petrolite Co., Ltd.) was used as a vehicle.

A magenta pigment (trade name, KET Red 310; manufactured by Dainippon Ink & Chemicals Inc.; Example 3-2) falling under Pigment Red 122 or a magenta pigment (trade name, Fast Rose Conc; manufactured by Dainichiseika Color & Chemicals Mgf. Co., Ltd.; Comparative Example 3-1) falling under Pigment Red 81 was added as a colorant to the vehicle in an amount of 2.3 or 0.5 wt %, respectively, based on all ingredients. The resultant mixtures each in an amount of 300 g were separately kneaded with heating by means of the same apparatus as in Example 3-1 (bead mill) until homogeneous molten mixtures were obtained (3 hours). Subsequently, the molten mixtures were filtered with heating and pressurizing to remove impurities, etc., and then allowed to cool at room temperature. Thus, homogeneous magenta ink compositions were obtained. The rotational speed of the bead mill was 2,500 rpm.

TABLE 3-1

|  | Comparative Example 3-1 | Example 3-2 |
|---|---|---|
| Colorant | Fast Rose Conc | KET Red 310 |
| Color Index No. | Pigment Blue 81 | Pigment Red 122 |
| Colorant amount (wt %) | 0.5 | 2.3 |
| Vehicle | UNILIN 425 | |
| Melt viscosity (mPa · s) | 10 | 11 |
| Ink separation (%) (130° C./3 d) | 0 | 0 |
| C* | 44 | 70 |
| H° (°) | 3.1 | 352.0 |
| ΔE* (xenon lamp, 100 h) | >20 (16 at 24 h) | 2.2 |

The melt viscosities of the ink compositions at 130° C. were 11 mPa·s (Example 3-2) and 10 mPa·s (Comparative Example 3-1). As Table 3-1 shows, the ink containing the pigment falling under Pigment Red 122 had satisfactory magenta color characteristics with a C* of 70 and an H° of 352.0 and satisfactory light resistance with a ΔE* of 2.2. In contrast, the ink containing the pigment falling under Pigment Red 81 had insufficient properties.

The ink prepared in Example 3-2 was subjected to the light resistance test with a xenon lamp over longer periods. As a result, the values of ΔE* thereof were 3.4 (300 h), 3.9 (500 h), and 4.4 (700 h). This ink of the present invention was thus ascertained to have excellent light resistance.

EXAMPLE 3-3

A mixture of 50 wt % alcohol type wax (trade name, UNILIN 550; manufactured by Toyo Petrolite Co., Ltd.) and 50 wt % ester-amide (trade name, Kawaslip SA; manufactured by Kawaken Fine Chemicals Co., Ltd.) was used as a vehicle. A magenta pigment (trade name, Colortex Red UG276; manufactured by Sanyo Color Works, Ltd.) falling under Pigment Red 122 was added as a colorant to the vehicle in an amount of 2.5 w % based on all ingredients. The resultant mixture in an amount of 300 g was kneaded with heating by means of the same apparatus as in Example 3-1 (bead mill; Example 3-3), a stirring mill (a dry/wet mill manufactured by Kurimoto, Ltd.; Comparative Example 3-2), or an attritor (Type MA01SC, manufactured by Mitsui Mining Co., Ltd.; Comparative Example 3-2) until a homogeneous molten mixture was obtained (3 hours). Subsequently, the molten mixtures were filtered with heating and pressurizing to remove impurities, etc., and then allowed to cool at room temperature. Thus, homogeneous magenta ink compositions and ink analogues were obtained. The rotational speed of the stirring mill was 450 rpm, and those of the attritor were 100 and 300 rpm. The rotational speeds of the bead mill were 2,000, 2,500, and 4,000 rpm.

The inks and ink analogues obtained each was placed in a 12-mm diameter test tube and allowed to stand at 135° C. for 3 days to examined the ink for layer separation (the proportion of a separated layer is shown in terms of %). Furthermore, the melt viscosity of each composition at 130° C. was measured in the same manner as in Example 3-1.

TABLE 3-2

|  | Comparative Example 3-2 | | | Example 3-3 | | |
|---|---|---|---|---|---|---|
| Colorant | Chromofine Magenta 6880 | | | | | |
| Vehicle | Unilin 550 + Kawaslip SA | | | | | |
| Mixing/stirring apparatus | attritor | | stirring mill | bead mill | | |
| Rotational speed (rpm) | 100 | 300 | 450 | 2000.2 | 2500 | 4000 |
| Kneading period (h) | 6 | 6 | 6 | 3 | 3 | 3 |
| Ink separation (%) | 68 | 40 | 26 | 2 | 0 | 0 |
| Melt viscosity (mPa · s) | — | — | —# | 12.2 | 14.6 | 15.0 |

: unable to be measured because of ink separation (appeared to have the same viscosity as the vehicle)

The results obtained are shown in Table 3-2. The ink compositions produced in Example 3-3 by the processes according to the present invention each had a viscosity of 15 mPa·s or lower and satisfactory dispersion stability. In contrast, the ink analogues, which were produced at low rotational speeds, each had poor dispersion stability and underwent considerable ink layer separation.

EXAMPLE 3-4

A mixture of 50 wt % alcohol type wax (trade name, OX020T; manufactured by Nippon Seiro Co., Ltd.), 30 wt % Kawaslip SA, and 20 wt % poly(vinyl acetate) (trade name, AC401; manufactured by Allied Chemical Corp.) was used as a vehicle. A treated magenta pigment (trade name, Colortex Red UG515; manufactured by Sanyo Color Works, Ltd.; Example 3-4) falling under Pigment Red 122, a red pigment (trade name, Colortex Red P625; manufactured by Sanyo Color Works, Ltd.; Comparative Example 3-3) falling under Pigment Red 48:2, or a red pigment (trade name, KET Red 337; manufactured by Dainippon Ink & Chemicals, Inc.; Comparative Example 3-3) falling under Pigment Red 57:1 was added as a colorant to the vehicle in an amount of from 2 to 0.5 wt % based on all ingredients as shown in Table 3-2. The resultant mixtures each was kneaded with heating in the same manner as in Example 3-1 until a homogeneous molten mixture was obtained (about 6 hours). Subsequently, the molten mixtures were filtered with heating and pressurizing to remove impurities, etc., and then allowed to cool at room temperature. Thus, a homogeneous magenta ink composition and three ink analogues were obtained.

TABLE 3-2

| | Comparative Example 3-3 | | | Example 3-4 |
|---|---|---|---|---|
| | KET Red 337 PR 57:1 | Colortex Red P625 PR 48:2 | | Colortex Red UG276 PR 122 |
| Concentration (%) | 1.5 | 0.5 | 1.5 | 2.0 |
| Separation (%) | 0 | 0 | 0 | 0 |
| Viscosity (mPa · s) | 12.5 | 10.5 | 9.8 | 15 |
| a* | 60.8 | 62.8 | 64.4 | 71.0 |
| b* | 19.4 | 0.85 | 23.9 | −10.0 |
| c* | 63.8 | 62.8 | 68.7 | 71.7 |
| H° (°) | 17.7 | 0.8 | 20.4 | 352.0 |
| ΔE* | >20 | | >20 | <5 |

The same evaluations as in Example 3-1 were conducted. The results obtained are shown in Table 3-3. All the inks were satisfactory in dispersion stability and melt viscosity. However, the ink containing the pigment falling under Pigment Red 48:2 and those containing the pigment falling under Pigment Red 57:1 each had a bright red tone and was hence unable to be used as a magenta ink, although the former ink had a C* of 65 or higher.

The print obtained with the ink composition according to the present invention which contained the pigment falling under Pigment Red 122 exhibited satisfactory light resistance with a color difference ΔE of 5 or smaller in the same xenon lamp irradiation test (100 h) as in Example 3-1. In contrast, the ink analogues containing the pigments falling under Pigment Reds 48:2 and 57:1 underwent color fading with a ΔE of 20 or larger.

EXAMPLE 3-5

A mixture of 50 wt % UNILIN 550 and 50 wt % OX1949 (manufactured by Nippon Seiro Co., Ltd.) was used as a vehicle. Magenta pigment Liogen Magenta RR-122 (manufactured by Toyo Ink Mfg. Co., Ltd.), falling under Pigment Red 122, was added as a colorant to the vehicle in an amount of 2 wt %. The resultant mixture in an amount of 500 g was kneaded with heating at 130° C. by means of a bead mill until a homogeneous molten mixture was obtained (about 6 hours). Subsequently, the molten mixture was filtered with heating and pressurizing to remove impurities, etc.,. and then allowed to cool at room temperature to obtain a homogeneous magenta ink composition.

This ink composition was heated to 130° C. to measure the melt viscosity thereof five times in the same manner as in Example 3-1. The average of the five found values was 10 mPa·s.

This ink was placed in an ink-jet printer in the same manner as in Example 3-1 and ejected from all nozzles. The ink in the printer was allowed to stand in a molten state for 3 days and then ejected. As a result, the ink was ascertained to be ejected from all nozzles satisfactorily. Furthermore, the ink was placed in a test tube having a diameter of 12 mm and allowed to stand at 135° C. in a molten state in the same manner as in Example 3-1. As a result, the dispersion underwent no separation in one week.

Comparative Example 3-4

A vehicle/pigment mixture having the same composition as in Example 3-1 was kneaded with heating (2 hours) by means of a stirring mixer (Labo Stirrer LR-41B, manufactured by Yamato K. K.; rotational speed, 100 rpm) to prepare a magenta ink analogue.

This ink analogue was heated to 130° C. to measure the melt viscosity thereof five times with a rotational viscometer in the same manner as in Example 3-1. The average of the five found values was 9 mPa·s.

The ink analogue was placed in an ink-jet printer in the same manner as in Example 3-1, and was ascertained to be ejected continuously. The ink analogue in the printer was allowed to stand in a molten state for 3 days and then used for printing again. In this printing operation, the number of nozzles from which ejection was impossible was counted. As a result, about 50% (50 nozzles) of all nozzles suffered an ejection failure. Furthermore, the ink analogue was placed in a test tube having a diameter of 12 mm and allowed to stand at 135° C. in a molten state in the same manner as in Example 3-1. After 1-week standing, an upper layer containing no colorant had appeared, which accounted for about 80% of the whole melt. Thus, the melt was found to separate into two layers.

Comparative Example 3-5

A vehicle consisting only of a monoamide (Kemamide S-180, manufactured by Witco Corp.) was used. Magenta pigment Hostaperm Pink E (manufactured by Hoechst AG) was added as a colorant to the vehicle in an amount of 1.5 wt %. The resultant mixture in an amount of 500 g was kneaded with heating at 130° C. by means of a bead mill until a homogeneous mixture was obtained (about 6 hours). Subsequently, the molten mixture was filtered with heating and pressurizing to remove impurities, etc., and then allowed to cool at room temperature to obtain a homogeneous magenta ink analogue.

This hot-melt ink analogue was heated to 130° C. to measure the melt viscosity thereof five times with a rotary viscometer in the same manner as in Example 3-1. The average of the five found values was 20 mPa·s.

This ink analogue was placed in an ink-jet printer and examined for suitability for ejection in the same manner as in Example 3-1. In the initial stage, the ink analogue was ejected from all nozzles. However, when the ink analogue was allowed to stand in a molten state for 3 days and then used for printing, about 30% (30 nozzles) of all nozzles suffered an ejection failure even when a voltage higher than the ordinary value was applied thereto. Furthermore, the ink analogue was placed in a test tube having a diameter of 12 mm and allowed to stand at 135° C. in a molten state in the same manner as in Example 3-1. On the second day, an upper layer containing no colorant appeared, which accounted for about 18% of the whole melt. Thus, the melt was found to separate into two layers.

The hot-melt magenta ink composition for ink-jet printing of the present invention attains both dispersion stability and suitability for ejection unlike conventional hot-melt ink compositions containing a quinacridone magenta pigment as a colorant. Consequently, it has become possible to produce an ink which has better light resistance and a wider range of applications than conventional inks containing a magenta pigment as a colorant.

EXAMPLE 4-1

An alcohol type wax (trade name, UNILIN 425; manufactured by Toyo Petrolite Co., Ltd.) containing a small amount of a dispersant was used as a vehicle. A yellow pigment (manufactured by Sanyo Color Works, Ltd.) falling under C.I. Pigment Yellow 93 was added as a colorant to the vehicle in a concentration of 1.5 wt % based on the vehicle.

The resultant mixture was kneaded with heating by means of a homogenizer (HG30, manufactured by Hitachi Koki Co., Ltd.) at 130° C. and a rotational speed of 10,000 rpm until a homogeneous molten mixture was obtained. Subsequently, the molten mixture was filtered with heating and pressurizing to remove impurities, etc., and then allowed to cool at room temperature to obtain a homogeneous hot-melt yellow ink.

On the other hand, a magenta pigment (trade name, KET Red 310; manufactured by Dainippon Ink & Chemicals, Inc.) falling under C.I. Pigment Red 122 was added as a colorant to the above vehicle in a concentration of 2 5 wt % based on all ingredients. The resultant mixture was kneaded with heating by means of a bead mill (Motor Mill M-250, manufactured by Igor Corp.; beads, 1-mm diameter zircon) at 130° C. and a rotational speed of 2,500 rpm until a homogeneous molten mixture was obtained. Subsequently, the molten mixture was filtered with heating and pressurizing to remove impurities, etc., and then allowed to cool at room temperature to obtain a homogeneous hot-melt magenta ink.

Furthermore, a mixture of 55 wt % UNILIN 425, described above, and 45 wt % another alcohol type wax (OX1949, manufactured by Nippon Seiro Co., Ltd.) was used as a vehicle. A cyan pigment (trade name, Fastogen Blue 5410G; manufactured by Dainippon Ink & Chemicals, Inc.) falling under C.I. Pigment Blue 15:4 was added as a colorant to the vehicle in a concentration of 1.5 wt % based on all ingredients. The resultant mixture was kneaded with heating by means of a bead mill in the same manner, subsequently filtered with heating and pressurizing, and then allowed to cool at room temperature to obtain a homogeneous hot-melt cyan ink.

The thus-produced yellow, magenta, and cyan inks (hereinafter referred to as "Y", "M", and "C", respectively) had melt viscosities at 130° C. of 11.3, 12.0, and 11.4 mPa·s, respectively.

These inks were placed in an ink-jet printer (JOLT SJO1A, manufactured by Hitachi Koki Co., Ltd.) to conduct printing. The resultant prints were examined with a color difference meter (Σ90, manufactured by Nippon Denshoku Kogyo K. K.) to measure the chroma C* and hue H°. The paper used was Plain Paper 4025, purchased of Xerox Corp. The results obtained are shown in Table 4-1.

TABLE 4-1

|   | a* | b* | C* | H° |
|---|---|---|---|---|
| Y | −17.94 | 80.15 | 82.13 | 102.62 |
| R | 57.78 | 35.74 | 67.94 | 31.74 |
| M | 70.38 | −10.52 | 71.16 | 351.50 |
| B | 31.52 | −42.27 | 52.73 | 306.71 |
| C | −14.98 | −50.9 | 53.06 | 253.60 |
| G | −65.04 | 7.52 | 65.47 | 173.40 |

In Table 4-1, Y, M, and C indicate the printing results for the yellow, magenta, and cyan inks, respectively, and R, G, and B indicate the printing results for red, green, and blue inks, respectively, each prepared by mixing an equal amount of two of the above three primary-color inks with each other. A CIE chromaticity gamut diagram (a* vs. b* plot) representing these results is shown in FIG. 4-1, wherein the points indicate the found values for the respective colors (corresponding to Table 4-1).

In the figure, the thick curves indicate the results concerning color change obtained when the printing density was varied with respect to each primary color. The results show that high chromas were obtained in limited hue ranges (i.e., in limited concentration ranges). The other many curves in the figure were obtained by calculating the chromaticities of mixtures of the primary colors in various proportions using the Kubelka-Munk equation based on the color characteristics of each primary color and plotting the calculated chromaticities. Except for G, the calculated chromaticity values for R and B were close to the values obtained through experiments. The envelope for these curves indicates the range in which color reproduction with these Y, M, and C inks was possible. The chromaticity diagram thus shows that in the ink system of the present invention, a satisfactory wide range of color reproduction was obtained.

Prints respectively obtained with the above inks of six colors (Y, M, C, R, B, and G) were subjected to an accelerated light deterioration test with a xenon lamp. In this test, each print was continuously irradiated with a xenon lamp tester (SunChex, manufactured by Atras Corp.) regulated so as to have a wavelength of 340 nm, a luminous energy of 0.35 W/m$^2$, and a sample temperature of 60° C., and the color change ΔE of each sample was measured at suitable intervals. The results obtained are shown in FIGS. 4-2.

Figures 1, 4:
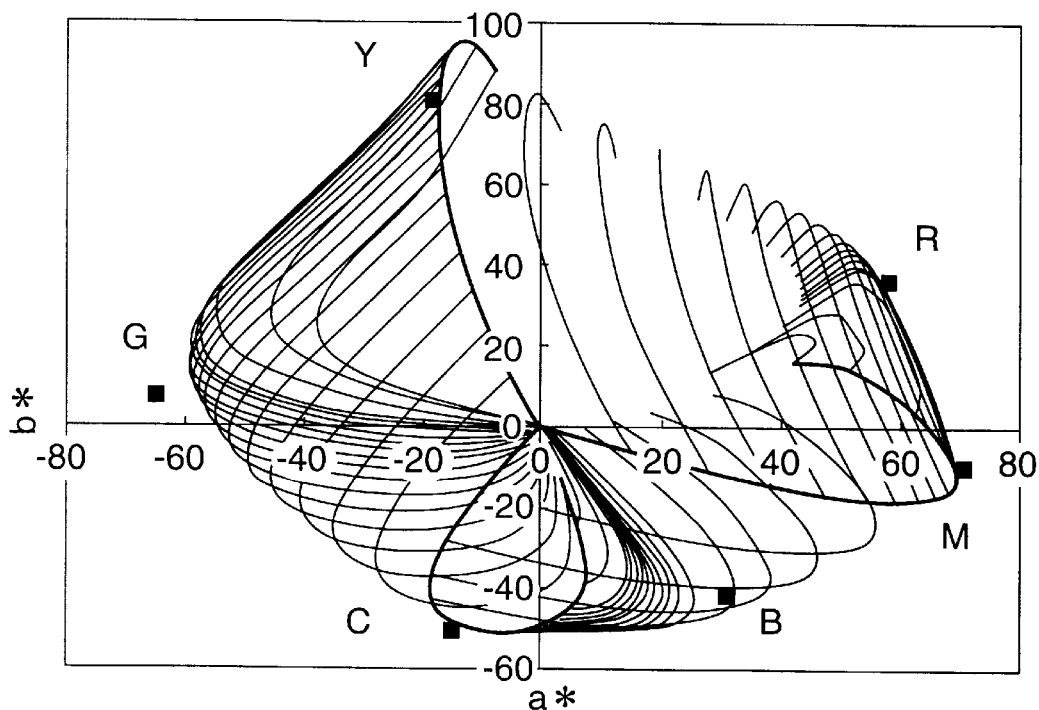
Figures 2, 4:
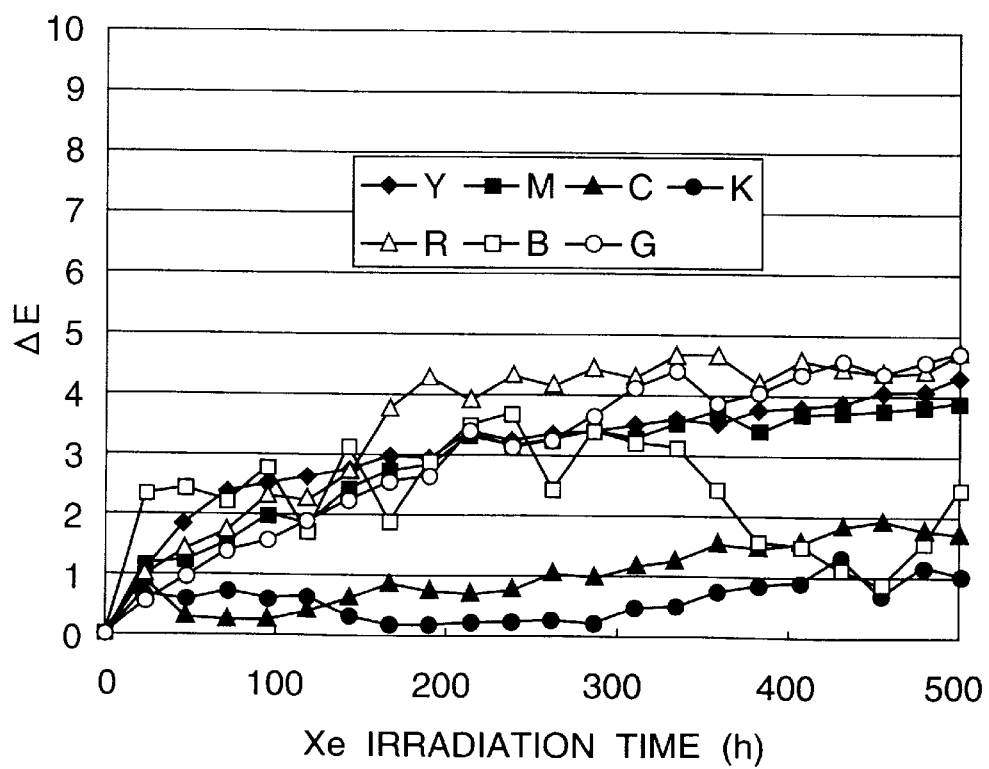

As shown in FIGS. 4-2, the samples each had a ΔE of 3.0 or smaller after 100-hour irradiation and 5.0 or smaller even after 500 hours. Thus, all samples exhibited extremely high light resistance.

The above-described inks according to the present invention could attain both satisfactory color reproduction ranges and satisfactory light resistance.

EXAMPLES 4-2 to 4-5

Inks according to the present invention were prepared which respectively had the compositions shown in Table 4-2. These inks were evaluated for melt viscosity, color characteristics, and light resistance. In Table 4-2, each numeral indicating the amount of a vehicle ingredient is given in wt % based on all vehicle ingredients to be mixed, and the amount of each colorant is given in wt % based on the vehicle. For the purpose of comparison, part of the results obtained in Example 4-1 are also given in Table 4-2.

For kneading, the same homogenizer or bead mill as in Example 4-1 was used. The same methods as in Example 4-1 were used for printing and property measurements. Each combination of three colors had satisfactory maximum chromas, wide hue angle ranges sufficient to match the three colors with one another, and light resistance. The ink combinations according to the present invention thus proved to be highly effective.

TABLE 4-2

| Ink Composition and Properties | | | Example 4-1 | | | Example 4-2 | | | Example 4-3 | | | Example 4-4 | | | Example 4-5 | | |
|---|---|---|---|---|---|---|---|---|---|---|---|---|---|---|---|---|---|
| Ingredient | Trade name | Manufacturer | Y | M | C | Y | M | C | Y | M | C | Y | M | C | Y | M | C |
| Vehicle | | | | | | | | | | | | | | | | | |
| Alcohol type wax | UNILIN 425 | Toyo Petrolite | 95 | 95 | 55 | 80 | | | 80 | | | 100 | 100 | 100 | | | |
| | UNILIN 550 | Toyo Petrolite | | | | | 80 | 80 | | 80 | 80 | 80 | | | | | |
| | UNILIN 350 | Toyo Petrolite | | | | | | | | | | | | | | | |
| | OX1949 | Nippon Seiro | | | 45 | 20 | 20 | 20 | 20 | 20 | 20 | | | | | | |
| | OX020T | Nippon Seiro | | | | | | | | | | | | | 50 | 50 | 50 |
| Amide type wax | Kawaslip SA | Kawaken Fine Chemicals | | | | | | | | | | | | | 30 | 30 | 30 |
| Polyvinyl acetate) | AC401 | Allied Chemical | | | | | | | | | | | | | 20 | 20 | 20 |
| Dispersant | GM-18S | Nikko Chemicals | 5 | 5 | | | | | | | | | | | | | |
| Colorant | | | | | | | | | | | | | | | | | |
| PY-93 | | Sanyo Color Works | 1.5 | | | | | | | | | 1.5 | | | | | |
| PY-94 | Chromophtal Yellow 6G | Chiba Specialty Chemicals | | | | 1 | | | | | | | | | | | |
| PY-95 | TVP24 | Toyo Ink | | | | | | | 3 | | | | | | | | |
| PY-128 | Chromophtal Yellow 8GN | Chiba Specialty Chemicals | | | | | | | | | | | | | 2 | | |
| PR-122 | KET RED310 | Dainippon Ink | | 2.5 | | | | | | | | | 2.3 | | | | |
| | KET RED309 | Dainippon Ink | | | | | 2 | | | 4 | | | | | | | |
| | Colortex Red UG515 | Sanyo Color Works | | | | | | | | | | | | | | 2 | |
| PB-15.4 | Fatogen Blue 5410G | Dainippon Ink | | | 1.5 | | | 1 | | | 3 | | | | | | |
| | Lionol Blue FG-7400G | Toyo Ink | | | | | | | | | | | | 1 | | | |
| | Lionol Blue 7405G | Toyo Ink | | | | | | | | | | | | | | | 1 |
| Melt viscosity | (mPa · s) | 130° C. | 11.3 | 12 | 11.4 | 11.5 | 12 | 12 | 15 | 15 | 15 | 12 | 11 | 11 | 14 | 15 | 10.4 |
| Color characteristics | ° C. | illuminant C/2° | 82 | 71 | 53 | 72 | 63 | 51 | 78 | 69 | 47 | 85 | 70 | 53 | 83 | 71 | 55 |
| | H° (°) | | 103 | 352 | 254 | 104 | 348 | 246 | 96 | 357 | 270 | 100 | 352 | 253 | 110 | 352 | 262 |
| Light resistance | ΔE | xenon lamp, 100 h (60° C.) | 2.5 | 2 | 0.3 | 0.2 | 2.3 | 0.8 | 3 | 3 | 1 | 1.5 | 2.2 | 1 | 5 | <5 | <3 |

The hot-melt ink compositions for ink-jet printing according to the present invention attain both wide color reproduction ranges and high light resistance. Consequently, the ink compositions can be used in a wide range of applications where conventional hot-melt ink-jet ink compositions have been unusable, such as the production of color prints having high fastness properties and capable of long-term storage, the production of prints for outdoor display which has been impossible with any conventional hot-melt ink-jet ink, etc.

While the invention has been described in detail and with reference to specific embodiments thereof, it will be apparent to one skilled in the art that various changes and modifications can be made therein without departing from the spirit and scope thereof.

What is claimed is:

1. A hot-melt ink composition for ink-jet printing in which an ink composition, which is solid at room temperature, is liquefied by heating and ejected to form an ink dot on a recording medium, said ink composition comprising at least one composition of:

(a) a cyan ink composition containing a cyan pigment as a colorant, wherein the cyan ink composition shows a maximum chroma $C^*$ on a recording medium of 50 or higher, a hue angle $H°$ at the maximum chroma of from 240° to 270° and a color difference $\Delta E^*$ of 3 or smaller as measured through 100-hour irradiation with xenon lamp light at a luminous energy of 0.35 W/m² and a wavelength of 340 nm;

(b) a yellow ink composition containing a yellow pigment as a colorant, wherein the yellow ink composition shows a maximum chroma $C^*$ on a recording medium of 70 or higher, a hue angle $H°$ at the maximum chroma of from 90° to 110° and a color difference $\Delta E^*$ of 5 or smaller as measured through 100-hour irradiation with xenon lamp light at a luminous energy of 0.35 W/m² and a wavelength of 340 nm; and (c) a magenta ink composition containing a magenta pigment as a colorant, wherein the magenta ink composition shows a maximum chroma $C^*$ on a recording medium of 60 or higher, a hue angle $H°$ at the maximum chroma of from 340° to 360° and a color difference $\Delta E^*$ of 5 or smaller as measured through 100-hour irradiation with xenon lamp light at a luminous energy of 0.35 W/m² and a wavelength of 340 nm.

2. The hot-melt ink composition according to claim 1, comprising said cyan ink composition (a), wherein said cyan pigment is a pigment which falls under C.I. Pigment Blue 15:4.

3. The hot-melt ink composition according to claim 1, comprising said yellow ink composition (b), wherein said yellow pigment is a pigment which falls under any of C.I. Pigment Yellows 93, 94, 95 and 128.

4. The hot-melt ink composition according to claim 1, comprising said magenta ink composition (c), wherein said magenta pigment is a pigment which falls under C.I. Pigment Red 122.

5. The hot-melt ink composition according to claim 2, wherein said cyan ink composition (a) further comprises an alcoholic wax having a hydroxyl value of from 20 to 150.

6. The hot-melt ink composition according to claim 2, wherein said cyan ink composition (a) has a melt viscosity of not higher than 15 mPa·s at the time of printing.

7. The hot-melt ink composition according to claim 5, wherein said cyan ink composition is produced by kneading ingredients comprising said pigment and said wax with a high-temperature bead mill at a rotational speed of not lower than 2,000 rpm.

8. The hot-melt ink composition according to claim 3, wherein said yellow ink composition (a) further comprises an alcoholic wax having a hydroxyl value of from 20 to 150.

9. The hot-melt ink composition according to claim 3, wherein said yellow ink composition (a) has a melt viscosity of not higher than 15 mPa·s at the time of printing.

10. The hot-melt ink composition according to claim 8, wherein said yellow ink composition is produced by kneading ingredients comprising said pigment and said wax with a high-temperature bead mill at a rotational speed of not lower than 2,000 rpm.

11. The hot-melt ink composition according to claim 4, wherein said magenta ink composition (a) further comprises an alcoholic wax having a hydroxyl value of from 20 to 150.

12. The hot-melt ink composition according to claim 4, wherein said magenta ink composition (a) has a melt viscosity of not higher than 15 mPa·s at the time of printing.

13. The hot-melt ink composition according to claim 11, wherein said magenta ink composition is produced by kneading ingredients comprising said pigment and said wax with a high-temperature bead mill at a rotational speed of not lower than 2,000 rpm.

14. The hot-melt ink composition according to claim 1, comprising said cyan ink composition (a), said yellow ink composition (b) and said magenta ink composition (c).

15. The hot-melt ink composition according to claim 14, wherein said cyan pigment is a pigment which falls under C.I. Pigment Blue 15:4, said yellow pigment is a pigment which falls under any of C.I. Pigment Yellows 93, 94, 95 and 128, and said magenta pigment is a pigment which falls under C.I. Pigment Red 122.

16. The hot-melt ink composition according to claim 14, further comprising an alcoholic wax having a hydroxyl value of from 20 to 150.

17. The hot-melt ink composition according to claim 14, having a melt viscosity of not higher than 15 mPa·s at the time of printing.

* * * * *